(12) United States Patent
Hu et al.

(10) Patent No.: US 12,192,153 B2
(45) Date of Patent: Jan. 7, 2025

(54) SUBCARRIER INDICES FOR DISTRIBUTED-TONE RESOURCE UNITS IN 6GHZ LOW-POWER INDOOR SYSTEMS

(71) Applicant: MediaTek Singapore Pte. Ltd., Singapore (SG)

(72) Inventors: Shengquan Hu, San Jose, CA (US); Jianhan Liu, San Jose, CA (US); Thomas Edward Pare, Jr., San Jose, CA (US)

(73) Assignee: MediaTek Singapore Pte. Ltd. (SG)

( * ) Notice: Subject to any disclaimer, the term of this patent is extended or adjusted under 35 U.S.C. 154(b) by 140 days.

(21) Appl. No.: 17/511,801

(22) Filed: Oct. 27, 2021

(65) Prior Publication Data
US 2022/0140988 A1 May 5, 2022

Related U.S. Application Data

(60) Provisional application No. 63/150,154, filed on Feb. 17, 2021, provisional application No. 63/107,551, filed on Oct. 30, 2020.

(51) Int. Cl.
*H04L 5/00* (2006.01)
*H04W 72/0453* (2023.01)

(52) U.S. Cl.
CPC .......... *H04L 5/0098* (2013.01); *H04L 5/0046* (2013.01); *H04L 5/0048* (2013.01); *H04W 72/0453* (2013.01)

(58) Field of Classification Search
CPC ... H04L 5/0098; H04L 5/0046; H04L 5/0048; H04L 5/0066; H04L 5/003; H04L 5/0007;
(Continued)

(56) References Cited

U.S. PATENT DOCUMENTS

2010/0284482 A1  11/2010  Cudak et al.
2012/0088515 A1  4/2012  Choi et al.
(Continued)

FOREIGN PATENT DOCUMENTS

CN  106717097 A  5/2017
CN  107113132 A  8/2017
(Continued)

OTHER PUBLICATIONS

China National Intellectual Property Administration, First Office Action in China Patent Application No. 202210141677.1, Apr. 22, 2023.
(Continued)

*Primary Examiner* — Yu-Wen Chang
(74) *Attorney, Agent, or Firm* — Andy M. Han; Han IP PLLC

(57) ABSTRACT

Various schemes pertaining to subcarrier indices for distributed-tone resource units (RUs) in 6 GHz low-power indoor (LPI) systems are described. A communication entity distributes frequency tones of a RU over a distribution bandwidth as a distributed-tone RU (dRU). The communication entity also generates generating a plurality of subcarrier indices for the distributed-tone RU such that a distribution of the distributed-tone RU is symmetric or asymmetric to a direct-current (DC) tone along an axis of subcarrier indices. The communication entity then communicates wirelessly using the distributed-tone RU in a 6 GHz LPI system.

20 Claims, 48 Drawing Sheets

(58) Field of Classification Search
CPC ......... H04W 72/0453; H04W 52/0212; H04W 72/0446
See application file for complete search history.

(56) References Cited

U.S. PATENT DOCUMENTS

| | | | |
|---|---|---|---|
| 2016/0226638 | A1 | 8/2016 | Azizi et al. |
| 2017/0310424 | A1 | 10/2017 | Chun et al. |
| 2018/0323837 | A1 | 11/2018 | Park et al. |
| 2019/0110261 | A1 | 4/2019 | Chen et al. |
| 2019/0190664 | A1* | 6/2019 | Porat ............... H04B 7/0617 |
| 2020/0014509 | A1 | 1/2020 | Asterjadhi et al. |
| 2020/0281027 | A1 | 9/2020 | Damnjanovic et al. |
| 2021/0143955 | A1 | 5/2021 | Yang et al. |
| 2021/0160889 | A1 | 5/2021 | Yang et al. |
| 2021/0400672 | A1* | 12/2021 | Chen ............... H04L 5/0064 |
| 2022/0239451 | A1* | 7/2022 | Park ............... H04L 27/2603 |
| 2023/0048884 | A1* | 2/2023 | Yang ............... H04L 5/0041 |

FOREIGN PATENT DOCUMENTS

| | | |
|---|---|---|
| CN | 107113140 A | 8/2017 |
| CN | 108781145 A | 11/2018 |
| TW | 200947992 A | 11/2009 |
| TW | 202025847 A | 7/2020 |
| WO | WO 2016137144 A1 | 9/2016 |

OTHER PUBLICATIONS

Taiwan Intellectual Property Office, Office Action for Taiwan Patent Application No. 110140408, Nov. 23, 2022.

European Patent Office, European Search Report for European Patent Application No. 22156849.6, Jul. 25, 2022.

Jinyoung Chun (LGE): "Pilot subcarriers for new tone plan"; IEEE Draft; 11-20-0838-03-00BE-PILOT-SUBCARRIERS-FOR-NEW-TONE-PLAN; IEEE-SA Mentor; Piscataway, NJ, USA; vol. 802.11 EHT; 802.11be, No. 3; Jun. 22, 2020; pp. 1-16.

Taiwan Intellectual Property Office, Office Action for Taiwan Patent Application No. 111105346, Aug. 29, 2022.

European Patent Office, European Search Report for European Patent Application No. 21205530.5, Mar. 30, 2022.

Edward Au (Huawei), "Specification Framework for TGbe", IEEE Draft, 11-19-1262-14-00BE-SPECIFICATION-FRAMEWORK-FOR-TGBE, IEEE-SA Mentor, Piscataway, NJ, USA, vol. 802.11 EHT; 802.11be, No. 14, Sep. 5, 2020, pp. 1-58, XP068172484.

Shahrnaz Azizi (Intel Corporation), "OFDMA Numerology and Structure; 11-15-0330-05-00ax-ofdma-numerology-and-structure", IEEE Draft, 11-15-0330-05-00AX-OFDMA-NUMEROLOGY-AND-STRUCTURE, IEEE-SA Mentor, Piscataway, NJ, USA, vol. 802.11ax, No. 5, May 14, 2015, pp. 1-50, XP068094351.

Chenchen Liu (Huawei), "Discussions on PAPR Reduction Methods for DUP Mode", IEEE Draft, 11-20-1206-01-00BE-DISCUSSIONS-ON-PAPR-REDUCTION-METHODS-FOR-DUP-MODE, IEEE-SA Mentor, Piscataway, NJ, USA, vol. 802.11 EHT, 802.11be, Sep. 28, 2020, pp. 1-14, XP068173626.

China National Intellectual Property Administration, First Office Action in China Patent Application No. 202111274384.2, Dec. 15, 2023.

USPTO, Office Action in U.S. Appl. No. 17/670,491, filed Jun. 27, 2024.

USPTO, Office Action in U.S. Appl. No. 17/670,491, filed Sep. 27, 2024.

* cited by examiner

Data and pilot subcarrier indices for distributed RUs (dRU) in a 20MHz EHT TB PPDU for 6GHz LPI

| dRU type | dRU index and subcarrier range | | | | |
|---|---|---|---|---|---|
| | dRU1 | dRU2 | dRU3 | dRU4 | dRU5 |
| 26-tone dRU | [-122:9:-14, 14:9:122] | [-118:9:-10, 10:9:118] | [-120:9:-12, 12:9:120] | [-116:9:-8, 8:9:116] | [-114:9:-6, 6:9:114] |
| | dRU6 | dRU7 | dRU8 | dRU9 | |
| | [-121:9:-13, 13:9:121] | [-117:9:-9, 9:9:117] | [-119:9:-11, 11:9:119] | [-115:9:-7, 7:9:115] | |
| 52-tone dRU f:1:4 | $dRU(i) = [L_{ru}, U_{ru}]$, where $L_{ru}=-122+S(i)+[V,V+N_p,V+2*N_p, ..., V+12*N_p]$, $U_{ru}=(-1)*fliplr(L_{ru})$; $N_p=9$; $V=[0,4]$; $S=[0, 2, 1, 3]$; | | | | |
| 106-tone dRU f:1:2 | $dRU(i) = [L_{ru}, U_{ru}]$, where $L_{ru}=-122+S(i)+[V,V+N_p,V+2*N_p, ..., V+12*N_p, V(1)+13*N_p]$; $U_{ru}=(-1)*fliplr(L_{ru})$; $N_p=9$; $V=[0,2,4,6]$; $S=[0, 1]$; | | | | |

FIG. 4

Data and pilot subcarrier indices for distributed RUs (dRU) in a 40MHz EHT TB PPDU for 6GHz LPI

| dRU type | dRU index and subcarrier range | | | | |
|---|---|---|---|---|---|
| | dRU1 | dRU2 | dRU3 | dRU4 | dRU5 |
| 26-tone dRU | [-244:18:-28, 28:18:244] | [-235:18:-19, 19:18:235] | [-240:18:-24, 24:18:240] | [-231:18:-15, 15:18:231] | [-236:18:-20, 20:18:236] |
| | dRU6 | dRU7 | dRU8 | dRU9 | dRU10 |
| | [-242:18:-26, 26:18:242] | [-233:18:-17, 17:18:233] | [-238:18:-22, 22:18:238] | [-229:18:-13, 13:18:229] | [-243:18:-27, 27:18:243] |
| | dRU11 | dRU12 | dRU13 | dRU14 | dRU15 |
| | [-234:18:-18, 18:18:234] | [-239:18:-23, 23:18:239] | [-230:18:-14, 14:18:230] | [-227:18:-11, 11:18:227] | [-241:18:-25, 25:18:241] |
| | dRU16 | dRU17 | dRU18 | | |
| | [-232:18:-16, 16:18:232] | [-237:18:-21, 21:18:237] | [-228:18:-12, 12:18:228] | | |
| 52-tone dRU i=1:8 | dRU(i) = [Lru, Uru], where Lru= -244+S(i)+[V,V+Np,V+2*Np, ..., V+12*Np]; Uru=(-1)*flplr(Lru); Np=18; V=[0,9]; S=[0,4,2,6,1,5,3,7]; | | | | |
| 106-tone dRU i=1:4 | dRU(i) = [Lru, Uru], where Lru= -244+S(i)+[V,V+Np,V+2*Np, ..., V+12*Np]; Uru=(-1)*flplr(Lru); Np=18; V=[0,4,9,13]; S=[0, 2, 1, 3]; | | | | |
| 242-tone dRU i=1:2 | dRU(1) = [Lru, Uru], where Lru= -244+S(1)+[V,V+Np,V+2*Np, ..., V+12*Np]; V(1:4)+13*Np]; Uru=(-1)*flplr(Lru); Np=18; V=[0,2, 4 ,6 ,8, 9,11,13,15]; S=[0, 1]; | | | | |
| | dRU(2) = [Lru, Uru], where Lru= -244+S(2)+[V,V+Np,V+2*Np, ..., V+12*Np, V(1:4)+13*Np]; Uru=(-1)*flplr(Lru); Np=18; V=[1,3, 5,7,10,12,14,16,17]; S=[0, 1]; | | | | |

FIG. 6

Data and pilot subcarrier indices for distributed RUs (dRU) in a 80MHz EHT TB PPDU for 6GHz LPI

| dRU type | | | dRU index and subcarrier range | | |
|---|---|---|---|---|---|
| 26-tone dRU | dRU1 [-500:37:-56, 56:37:500] | dRU2 [-484:37:-40, 40:37:484] | dRU3 [-492:37:-48, 48:37:492] | dRU4 [-476:37:-32, 32:37:476] | dRU5 [-468:37:-24, 24:37:468] |
| | dRU6 [-496:37:-52, 52:37:496] | dRU7 [-480:37:-36, 36:37:480] | dRU8 [-488:37:-44, 44:37:488] | dRU9 [-472:37:-28, 28:37:472] | dRU10 [-494:37:-50, 50:37:494] |
| | dRU11 [-478:37:-34, 34:37:478] | dRU12 [-486:37:-42, 42:37:486] | dRU13 [-470:37:-26, 26:37:470] | dRU14 [-466:37:-22, 22:37:466] | dRU15 [-498:37:-54, 54:37:498] |
| | dRU16 [-482:37:-38, 38:37:482] | dRU17 [-490:37:-46, 46:37:490] | dRU18 [-474:37:-30, 30:37:474] | dRU19 [-499:37:-55, 55:37:499] | dRU21 [-483:37:-39, 39:37:483] |
| | dRU22 [-491:37:-47, 47:37:491] | dRU23 [-475:37:-31, 31:37:475] | dRU24 [-467:37:-23, 23:37:467] | dRU25 [-495:37:-51, 51:37:495] | dRU26 [-479:37:-35, 35:37:479] |
| | dRU27 [-487:37:-43, 43:37:487] | dRU28 [-471:37:-27, 27:37:471] | dRU29 [-493:37:-49, 49:37:493] | dRU30 [-477:37:-33, 33:37:477] | dRU31 [-485:37:-41, 41:37:485] |
| | dRU32 [-469:37:-25, 25:37:469] | dRU33 [-465:37:-21, 21:37:465] | dRU34 [-497:37:-53, 53:37:497] | dRU35 [-481:37:-37, 37:37:481] | dRU36 [-489:37:-45, 45:37:489] |
| | dRU37 [-473:37:-29, 29:37:473] | | | | |
| 52-tone dRU i=1:16 | dRU(i) = [Lru, Uru], where Lru= -500+S(i)+[V,V+Np,V+2*Np, ..., V+12*Np]; Uru=(-1)*fliplr(Lru); Np=37; V=[0,16]; S=[0,8,4,12,6,14,2,10,1,9,5,13,7,15,3,11]; | | | | |
| 106-tone dRU i=1:8 | dRU(i) = [Lru, Uru], where Lru= -500+S(i)+[V,V+Np,V+2*Np, ..., V+12*Np, V(1)+13*Np]; Uru=(-1)*fliplr(Lru); Np=37; V=[0:8:24]; S=[0,4,6,2,1,5,7,3]; | | | | |
| 242-tone dRU i=1:4 | dRU(i) = [Lru, Uru], where Lru= -500+S(1)+[V,V+Np,V+2*Np, ..., V+12*Np, V(1:4)+13*Np]; Uru=(-1)*fliplr(Lru); Np=37; V=[0:4:32]; S=[0, 2,1,3]; | | | | |
| 484-tone dRU i=1:2 | dRU(i) = [Lru, Uru], where Lru= -500+S(1)+[V,V+Np,V+2*Np, ..., V+12*Np, V(1:8)+13*Np]; Uru=(-1)*fliplr(Lru); Np=37; V=[0:2:34]; S=[0, 1]; | | | | |

Note: dRU19 is not defined for 26-tone dRU

FIG. 7

Pilot indices for a 26-tone dRU

| PPDU BW | $K_{R26i}$ |
|---|---|
| 20MHz, i=1:9 | {-77,68}, {-73,64}, {-66,75}, {-62,71}, {-60,60}, {-76,67}, {-72,63}, {-65,74}, {-61,70} |
| 40MHz, i=1:18 | {-154,136}, {-145,127},{-150,132},{-141,123}, {-128,146}, {-143,125}, {-148,130},{-139,121}, {-135,153}, {-126,144},{-131,149}, {-122,140}, {-137,119},{-124,142}, {-129, 147}, {-120,138} |
| 80MHz, i=1:36 | {-315,278}, {-299,262},{-307,270},{-291 254},{-246 283}, {-311 274}, {-295 258},{-303 266},{-287 250}, {-309 272} 256},{-301 264},{-285 248},{-244 281},{-297 260},{-313 276},{-289 252}, {-277 314},{-261 298},{-269 306},{-253 290},{-285 248},{-244 281},{-297 260},{-313 276},{-289 252}, {-271 308}, {-255 292},{-263 300},{-247 284},{-280 243},{-275 312},{-259 296},{-267 304},{-251 288} |
| 160MHz, i=1:72 | TBD |
| 320MHz, i=1:144 | TBD |

Pilot indices for a 26-tone dRU

| PPDU BW | $K_{R26i}$ |
|---|---|
| 20MHz, i=1:9 | {−77,77}, {−73,73}, {−66,66}, {−62,62}, {−60,60}, {−76,76}, {−72,72}, {−65,65}, {−61,61} |
| 40MHz, i=1:18 | {−154,154}, {−145,145}, {−150,150}, {−141,141}, {−128,128}, {−152,152}, {−143,143}, {−148,148}, {−139,139}, {−135,135}, {−126,126}, {−131,131}, {−122,122}, {−137,137}, {−133,133}, {−124,124}, {−129, 129}, {−120,120} |
| 80MHz, i=1:36 | {−315,315}, {−299,299}, {−307,307}, {−291 291}, {−246 246}, {−311 311}, {−295 295}, {−303 303}, {−287 287}, {−309 309}, {−293 293}, {−301 301}, {−285 285}, {−244 244}, {−313 313}, {−297 297}, {−305 305}, {−289 289}, {−277 277}, {−261 261}, {−269 269}, {−253 253}, {−282 282}, {−273 273}, {−257 257}, {−265 265}, {−249 249}, {−271 271}, {−255 255}, {−263 263}, {−247 247}, {−280 280}, {−275 275}, {−259 259}, {−267 267}, {−251 251} |
| 160MHz, i=1:72 | TBD |
| 320MHz, i=1:144 | TBD |

FIG. 8B

Pilot indices for a 52-tone dRU

| PPDU BW | $K_{R52i}$ |
|---|---|
| 20MHz, i=1:4 | {−100 −37 32 95},{−93 −30 35 98},{−99 −36 31 94},{−92 −29 34 97} |
| 40MHz, i=1:8 | {−199 −73 64 190},{−195 −69 60 186},{−197 −71 62 188},{−193 −67 58 184},<br>{−189 −63 72 198},{−185 −59 68 194},{−187 −61 70 196},{−183 −57 66 192} |
| 80MHz, i=1:16 | {−410 −151 130 389},{−402 −143 122 381},{−406 −147 126 385},{−398 −139 118 377},<br>{−404 −145 124 383},{−396 −137 116 375},{−408 −149 128 387},{−400 −141 120 379},<br>{−388 −129 150 409},{−380 −121 142 401},{−384 −125 146 405},{−376 −117 138 397},<br>{−382 −123 144 403},{−374 −115 136 395},{−386 −127 148 407},{−378 −119 140 399} |
| 160MHz, i=1:32 | TBD |
| 320MHz, i=1:64 | TBD |

Pilot indices for a 52-tone dRU

| PPDU BW | $K_{R52i}$ |
|---|---|
| 20MHz, i=1:4 | {-100 -37 37 100}, {-93 -30 30 93}, {-99 -36 36 99}, {-92 -29 29 92} |
| 40MHz, i=1:8 | {-199 -73 73 199}, {-195 -69 69 195}, {-197 -71 71 197}, {-193 -67 67 193}, {-189 -63 63 189}, {-185 -59 59 185}, {-187 -61 61 187}, {-183 -57 57 183} |
| 80MHz, i=1:16 | {-410 -151 151 410}, {-402 -143 143 402}, {-406 -147 147 406}, {-398 -139 139 398}, {-404 -145 145 404}, {-396 -137 137 396}, {-408 -149 149 408}, {-400 -141 141 400}, {-388 -129 129 388}, {-380 -121 121 380}, {-384 -125 125 384}, {-376 -117 117 376}, {-382 -123 123 382}, {-374 -115 115 374}, {-386 -127 127 386}, {-378 -119 119 378} |
| 160MHz, i=1:32 | TBD |
| 320MHz, i=1:64 | TBD |

Pilot indices for a 106-tone dRU

| PPDU BW | $K_{R106i}$ |
|---|---|
| 20MHz, i=1:2 | {-109 -50 53 111},{-110 -52 49 108} |
| 40MHz, i=1:4 | {-222 -105 100 217},{-220 -103 98 215},{-216 -99 104 221},{-214 -97 102 219} |
| 80MHz, i=1:8 | {-455 -217 204 447},{-451 -213 200 443},{-449 -211 198 441},{-453 -215 202 445} {-446 -203 216 454},{-442 -199 212 450},{-440 -197 210 448},{-444 -201 214 452} |
| 160MHz, i=1:16 | TBD |
| 320MHz, i=1:32 | TBD |

(B)

Pilot indices for a 106-tone dRU

| PPDU BW | $K_{R106i}$ |
|---|---|
| 20MHz, i=1:2 | {-109 -50 50 109},{-110 -52 52 110} |
| 40MHz, i=1:4 | {-222 -105 105 222},{-220 -103 103 220},{-216 -99 99 216},{-214 -97 97 214} |
| 80MHz, i=1:8 | {-455 -217 217 455},{-451 -213 213 451},{-449 -211 211 449},{-453 -215 215 453} {-446 -203 203 446},{-442 -199 199 442},{-440 -197 197 440},{-444 -201 201 444} |
| 160MHz, i=1:16 | TBD |
| 320MHz, i=1:32 | TBD |

| PPDU BW | Pilot indices for a 242-tone dRU $K_{R242i}$ |
|---|---|
| 40MHz, i=1:2 | {-233 -181 -96 -44 42 94 179 231}, {-228 -176 -93 -41 43 95 178 230}, |
| 80MHz, i=1:4 | {-476 -369 -196 -89 85 192 365 472}, {-474 -367 -194 -87 83 190 363 470}, |
| | {-471 -364 -191 -84 88 195 368 475},{-469 -362 -189 -82 86 193 366 473}, |
| 160MHz, i=1:8 | TBD |
| 320MHz, i=1:16 | TBD |

(B)

| PPDU BW | Pilot indices for a 242-tone dRU $K_{R242i}$ |
|---|---|
| 40MHz, i=1:2 | {-233 -181 -96 -44 44 96 181 233}, {-228 -176 -93 -41 41 93 176 228}, |
| 80MHz, i=1:4 | {-476 -369 -196 -89 89 196 369 476}, {-474 -367 -194 -87 87 194 367 474}, |
| | {-471 -364 -191 -84 84 191 364 471},{-469 -362 -189 -82 82 189 362 469}, |
| 160MHz, i=1:8 | TBD |
| 320MHz, i=1:16 | TBD |

FIG. 11

Data and pilot subcarrier indices for distributed RUs (dRU) in a 20MHz EHT TB PPDU for 6GHz LPI

1200

| dRU type | dRU index and subcarrier range | | | | |
|---|---|---|---|---|---|
| | dRU1 | dRU2 | dRU3 | dRU4 | dRU5 |
| 26-tone dRU | [-122:9:-14, 2:9:110] | [-118:9:-10, 6:9:114] | [-120:9:-12, 4:9:112] | [-116:9:-8, 8:9:116] | [-114:9:-6, 10:9:118] |
| | dRU6 | dRU7 | dRU8 | dRU9 | |
| | [-121:9:-13, 3:9:111] | [-117:9:-9, 7:9:115] | [-119:9:-11, 5:9:113] | [-115:9:-7, 9:9:117] | |
| 52-tone dRU F1.1 | $dRU(i) = [L_{ru}, U_{ru}]$, where $L_{ru} = [-122+S(i)]+[V, V+4*N_p, V+2*N_p, ..., V+12*N_p]$, $i_{ru \_ end} = i_{ru \_ start} + 122$; 0:Shift, $N_p = 9$; $V = [0,4]$; $S = [0, 2, 1, 3]$; 0:Shift = 2; |
| 106-tone dRU F1.2 | $dRU(i) = [L_{ru}, U_{ru}]$, where $L_{ru} = [-122+S(i)]+[V, V+4*N_p, V+2*N_p, ..., V+12*N_p, V(i)+13*N_p]$, $i_{ru \_ end} = i_{ru \_ start} + 122$; 0:Shift, $N_p = 9$; $V = [0,2,4,6]$; $S = [0, 1]$; 0:Shift = 2; |

Data and pilot subcarrier indices for distributed RUs (dRU) in a 40MHz EHT TB PPDU for 6GHz LPI

| dRU type | dRU index and subcarrier range | | | | |
|---|---|---|---|---|---|
| | dRU1<br>[-244:18:-28, 3:18:219] | dRU2<br>[-235:18:-19, 12:18:228] | dRU3<br>[-240:18:-24, 7:18:223] | dRU4<br>[-231:18:-15, 16:18:232] | dRU5<br>[-236:18:-20, 11:18:227] |
| 26-tone dRU | dRU6<br>[-242:18:-26, 5:18:221] | dRU7<br>[-233:18:-17, 14:18:230] | dRU8<br>[-238:18:-22, 9:18:225] | dRU9<br>[-229:18:-13, 18:18:234] | dRU10<br>[-243:18:-27, 4:18:220] |
| | dRU11<br>[-234:18:-18, 13:18:229] | dRU12<br>[-239:18:-23, 8:18:224] | dRU13<br>[-230:18:-14, 17:18:233] | dRU14<br>[-227:18:-11, 20:18:236] | dRU15<br>[-241:18:-25, 6:18:222] |
| | dRU16<br>[-232:18:-16, 15:18:231] | dRU17<br>[-237:18:-21, 10:18:226] | dRU18<br>[-228:18:-12, 19:18:235] | | |
| 52-tone dRU<br>i=1:8 | dRU(i) = [Lru, Uru], where Lru=-244+S[i]+[V,V+Np,V+2*Np,...,V+12*Np]; Uru=Lru+244; Np=18; V=[0,9]; S=[0,4,2,6,1,5,3,7]; DC shift=3; | | | | |
| 106-tone dRU<br>i=1:4 | dRU(i) = [Lru, Uru], where Lru=-244+S[i]+[V,V+Np,V+2*Np,...,V+12*Np], V[1]+13*Np]; Uru=Lru+244; Np=18; V=[0,4,9,13]; S=[0,2,1,3]; DC shift=3; | | | | |
| 242-tone dRU<br>i=1:2 | dRU(1) = [Lru, Uru], where Lru=-244+S[1]+[V,V+Np,V+2*Np,...,V+12*Np, V[1]+13*Np]; Uru=Lru+244; Np=18; V=[0,2,4,6,8,9,11,13,15]; S=[0,1]; DC shift=3;<br>dRU(2) = [Lru, Uru], where Lru=-244+S[2]+[V,V+Np,V+2*Np,...,V+12*Np, V[1]+13*Np]; Uru=Lru+244; Np=18; V=[1,3,5,7,10,12,14,16,17]; S=[0,1]; DC shift=3; | | | | |

FIG. 13

Data and pilot subcarrier indices for distributed RUs (dRU) in a 80MHz EHT TB PPDU for 6GHz LPI

| dRU type | | dRU index and subcarrier range | | | |
|---|---|---|---|---|---|
| 26-tone dRU | dRU1 [-500:37:-56, 3:37:447] | dRU2 [-484:37:-40, 19:37:463] | dRU3 [-492:37:-48, 1:37:455] | dRU4 [-476:37:-32, 27:37:471] | dRU5 [-468:37:-24, 35:37:479] |
| | dRU6 [-496:37:-52, 7:37:451] | dRU7 [-480:37:-36, 23:37:467] | dRU8 [-488:37:-44, 15:37:459] | dRU9 [-472:37:-28, 31:37:475] | dRU10 [-494:37:-50, 9:37:453] |
| | dRU11 [-478:37:-34, 25:37:469] | dRU12 [-486:37:-42, 17:37:461] | dRU13 [-470:37:-26, 33:37:477] | dRU14 [-466:37:-22, 37:37:481] | dRU15 [-498:37:-54, 5:37:449] |
| | dRU16 [-482:37:-38, 21:37:465] | dRU17 [-490:37:-46, 13:37:457] | dRU18 [-474:37:-30, 29:37:473] | dRU20 [-499:37:-55, 4:37:448] | dRU21 [-483:37:-39, 20:37:464] |
| | dRU22 [-491:37:-47, 12:37:456] | dRU23 [-475:37:-31, 28:37:472] | dRU24 [-467:37:-23, 36:37:480] | dRU25 [-495:37:-51, 8:37:452] | dRU26 [-479:37:-35, 24:37:468] |
| | dRU27 [-487:37:-43, 16:37:460] | dRU28 [-471:37:-27, 32:37:476] | dRU29 [-493:37:-49, 10:37:454] | dRU30 [-477:37:-33, 26:37:470] | dRU31 [-485:37:-41, 18:37:462] |
| | dRU32 [-469:37:-25, 34:37:478] | dRU33 [-465:37:-21, 38:37:482] | dRU34 [-497:37:-53, 6:37:450] | dRU35 [-481:37:-37, 22:37:466] | dRU36 [-489:37:-45, 14:37:458] |
| | dRU37 [-473:37:-29, 30:37:474] | | | | |
| 52-tone dRU i=1:16 | dRU(i) = [Lru, Uru], where Lru=-500+S(i)+[V,V+Np,V+2*Np, ..., V+12*Np]; ...; Np=37; V=[0,16]; S=[0,8,4,12,6,14,2,10,1,9,5,13,7,15,3,11];... | | | | |
| 106-tone dRU i=1:8 | dRU(i) = [Lru, Uru], where Lru=-500+S(i)+[V,V+Np,V+2*Np, ..., V+12*Np]; ...; Np=37; V=[0,8:24]; S=[0,4,6,2,1,5,7,3];... | | | | |
| 242-tone dRU i=1:4 | dRU(i) = [Lru, Uru], where Lru=-500+S(i)+[V,V+Np,V+2*Np, ..., V+12*Np]; ...; Np=37; V=[0,4:32]; S=[0, 2,1,3];... | | | | |
| 484-tone dRU i=1:2 | dRU(i) = [Lru, Uru], where Lru=-500+S(i)+[V,V+Np,V+2*Np, ..., V+12*Np]; ...; Np=37; V=[0,2:34]; S=[0, 1];... | | | | |

Note: dRU19 is not defined for 26-tone dRU

FIG. 14

Pilot indices for a 26-tone dRU

| PPDU BW | $K_{R26i}$ |
|---|---|
| 20MHz, i=1:9 | {-77,56}, {-73,60}, {-66,67}, {-62,71}, {-60,64}, {-76,57}, {-72,61}, {-65,68}, {-61,72} |
| 40MHz, i=1:18 | {-154,111}, {-145,120}, {-150,1115}, {-141,124}, {-128,131}, {-152,113}, {-143,122}, {-148,117}, {-139,126}, {-135,130}, {-126,139}, {-131,134}, {-122,143}, {-137,128}, {-133,132}, {-124,141}, {-129, 136}, {-120,145} |
| 80MHz, i=1:36 | {-315,225}, {-299,241},{-307,233},{-291 249}, {-246 294}, {-311 229}, {-295 245},{-303 237},{-287 253}, {-309 231},{-293 247},{-301 239},{-285 255},{-244 296},{-313 227},{-297 243},{-305 235},{-289 251}, {-277 263},{-261 279},{-269 271},{-253 287},{-282 258},{-273 247},{-257 283},{-265 275},{-249 271}, {-271 269},{-255 285},{-263 277},{-247 293},{-280 260},{-275 265},{-259 281},{-267 273},{-251 289} |
| 160MHz, i=1:72 | TBD |
| 320MHz, i=1:144 | TBD |

Pilot indices for a 52-tone dRU

| PPDU BW | $K_{R52i}$ |
|---|---|
| 20MHz, i=1:4 | {−100 −37 24 87},{−93 −30 31 94},{−99 −36 25 88},{−92 −29 32 95} |
| 40MHz, i=1:8 | {−199 −73 48 174},{−195 −69 52 178},{−193 −67 54 180}, {−189 −63 58 184},{−185 −59 62 188},{−187 −61 60 186},{−183 −57 64 190} |
| 80MHz, i=1:16 | {−410 −151 93 352},{−402 −143 101 360},{−406 −147 97 356},{−398 −139 105 364}, {−404 −145 99 358},{−396 −137 107 366},{−408 −149 95 354},{−400 −141 103 362}, {−388 −129 115 374},{−380 −121 123 382},{−384 −125 119 378},{−376 −117 127 386}, {−382 −123 121 380},{−374 −115 129 388},{−386 −127 117 376},{−378 −119 125 384} |
| 160MHz, i=1:32 | TBD |
| 320MHz, i=1:64 | TBD |

FIG. 16

Pilot indices for a 106-tone dRU

| PPDU BW | $K_{R106i}$ |
|---|---|
| 20MHz, i=1:2 | {−109 −50 49 107}, {−110 −52 48 106} |
| 40MHz, i=1:4 | {−222 −105 93 210}, {−220 −103 95 212}, {−216 −99 98 215}, {−214 −97 100 217}, |
| 80MHz, i=1:8 | {−455 −217 188 426}, {−451 −213 192 430}, {−449 −211 194 432}, {−453 −215 190 428}, {−446 −203 197 435}, {−442 −199 201 439}, {−440 −197 203 441}, {−444 −201 199 437}, |
| 160MHz, i=1:16 | TBD |
| 320MHz, i=1:32 | TBD |

Pilot indices for a 242-tone dRU

| PPDU BW | $K_{R242i}$ |
|---|---|
| 40MHz, i=1:2 | {-233 -181 -96 -44 41 93 176 228}, {-228 -176 -93 -41 44 96 181 233}, |
| 80MHz, i=1:4 | {-476 -369 -196 -89 81 188 360 467}, {-474 -367 -194 -87 83 190 362 469}, {-471 -364 -191 -84 86 193 365 472}, {-469 -362 -189 -82 88 195 367 474}, |
| 160MHz, i=1:8 | TBD |
| 320MHz, i=1:16 | TBD |

Data and pilot subcarrier indices for distributed RUs (dRU) in a 20MHz EHT TB PPDU for 6GHz LPI

| dRU type | dRU index and subcarrier range | | | | |
|---|---|---|---|---|---|
| | dRU1 | dRU2 | dRU3 | dRU4 | dRU5 |
| 26-tone dRU i=1..9 | [-122:9:-14, 14:9:122] | [-118:9:-10, 10:9:118] | [-120:9:-12, 12:9:120] | [-116:9:-8, 8:9:116] | [-114:9:-6, 6:9:114] |
| | dRU6 | dRU7 | dRU8 | dRU9 | |
| | [-121:9:-13, 13:9:121] | [-117:9:-9, 9:9:117] | [-119:9:-11, 11:9:119] | [-115:9:-7, 7:9:115] | |
| 52-tone dRU i=1..4 | dRU1 26-tone [dRU1,dRU2] | | dRU2 26-tone [dRU3,dRU4] | | |
| | dRU3 26-tone [dRU6,dRU7] | | dRU4 26-tone [dRU8,dRU9] | | |
| 106-tone dRU i=1..2 | dRU1 26-tone [dRU1~4], [-5,5] | | dRU2 26-tone [dRU6~9], [-4,4] | | |

FIG. 19

Data and pilot subcarrier indices for distributed RUs (dRU) in a 20MHz EHT TB PPDU for 6GHz LPI

| dRU type | dRU index and subcarrier range | | | | |
|---|---|---|---|---|---|
| | dRU1 | dRU2 | dRU3 | dRU4 | dRU5 |
| 26-tone dRU i=1:9 | [-118:9:-10, 10:9:118] | [-114:9:-6, 6:9:114] | [-116:9:-8, 8:9:116] | [-112:9:-4, 4:9:112] | [-110:9:-2, 2:9:110] |
| | dRU6 | dRU7 | dRU8 | dRU9 | |
| | [-117:9:-9, 9:9:117] | [-113:9:-5, 5:9:113] | [-115:9:-7, 7:9:115] | [-111:9:-3, 3:9:111] | |
| 52-tone dRU i=1:4 | dRU1 26-tone [dRU1,dRU2] | | dRU2 26-tone [dRU3,dRU4] | | |
| | dRU3 26-tone [dRU6,dRU7] | | dRU4 26-tone [dRU8,dRU9] | | |
| 106-tone dRU i=1:2 | dRU1 26-tone [dRU1~4], [-121,121] | | dRU2 26-tone [dRU6~9], [-120,120] | | |

FIG. 20

Data and pilot subcarrier indices for distributed RUs (dRU) in a 20MHz EHT TB PPDU for 6GHz LPI

| dRU type | dRU index and subcarrier range | | | | |
|---|---|---|---|---|---|
| | dRU1 | dRU2 | dRU3 | dRU4 | dRU5 |
| 26-tone dRU i=1:9 | [-122:9:-14, 2:9:110] | [-118:9:-10, 6:9:114] | [-120:9:-12, 4:9:112] | [-116:9:-8, 8:9:116] | [-114:9:-6, 10:9:118] |
| | dRU6 | dRU7 | dRU8 | dRU9 | |
| | [-121:9:-13, 3:9:111] | [-117:9:-9, 7:9:115] | [-119:9:-11, 5:9:113] | [-115:9:-7, 9:9:117] | |
| 52-tone dRU i=1:4 | dRU1 26-tone [dRU1,dRU2] | | dRU2 26-tone [dRU3,dRU4] | | |
| | dRU3 26-tone [dRU6,dRU7] | | dRU4 26-tone [dRU8,dRU9] | | |
| 106-tone dRU i=1:2 | dRU1 26-tone [dRU1~4], [-5,2] | | dRU2 26-tone [dRU6~9], [-4,3] | | |

FIG. 21

Data and pilot subcarrier indices for distributed RUs (dRU) in a 20MHz EHT TB PPDU for 6GHz LPI

| dRU type | dRU index and subcarrier range | | | | |
|---|---|---|---|---|---|
| | dRU1 | dRU2 | dRU3 | dRU4 | dRU5 |
| 26-tone dRU i=1:9 | [-118:9:-10, 2:9:110] | [-114:9:-6, 6:9:114] | [-116:9:-8, 4:9:112] | [-112:9:-4, 8:9:116] | [-110:9:-2, 10:9:118] |
| | dRU6 | dRU7 | dRU8 | dRU9 | |
| | [-117:9:-9, 3:9:111] | [-113:9:-5, 7:9:115] | [-115:9:-7, 5:9:113] | [-111:9:-3, 9:9:117] | |
| 52-tone dRU i=1:4 | dRU1 26-tone [dRU1,dRU2] | | dRU2 26-tone [dRU3,dRU4] | | |
| | dRU3 26-tone [dRU6,dRU7] | | dRU4 26-tone [dRU8,dRU9] | | |
| 106-tone dRU i=1:2 | dRU1 26-tone [dRU1~4], [-121,119] | | dRU2 26-tone [dRU6~9], [-120,120] | | |

FIG. 22

Data and pilot subcarrier indices for distributed RUs (dRU) in a 40MHz EHT TB PPDU for 6GHz LPI

| dRU type | dRU index and subcarrier range | | | | | |
|---|---|---|---|---|---|---|
| 26-tone dRU (i=1:18) | dRU1 [-244:18:-28, 28:18:244] | dRU2 [-235:18:-19, 19:18:235] | dRU3 [-240:18:-24, 24:18:240] | dRU4 [-231:18:-15, 15:18:231] | dRU5 [-236:18:-20, 20:18:236] | dRU6 [-242:18:-26, 26:18:242] |
| | dRU7 [-233:18:-17, 17:18:233] | dRU8 [-238:18:-22, 22:18:238] | dRU9 [-229:18:-13, 13:18:229] | dRU10 [-243:18:-27, 27:18:243] | dRU11 [-234:18:-18, 18:18:234] | dRU12 [-239:18:-23, 23:18:239] |
| | dRU13 [-230:18:-14, 14:18:230] | dRU14 [-227:18:-11, 11:18:227] | dRU15 [-241:18:-25, 25:18:241] | dRU16 [-232:18:-16, 16:18:232] | dRU17 [-237:18:-21, 21:18:237] | dRU18 [-228:18:-12, 12:18:228] |
| 52-tone dRU (i=1:8) | dRU1 26-tone [dRU1,dRU2] | | dRU2 26-tone [dRU3,dRU4] | | dRU3 26-tone [dRU6,dRU7] | |
| | dRU4 26-tone [dRU8,dRU9] | | dRU5 26-tone [dRU10,dRU11] | | dRU6 26-tone [dRU12,dRU13] | |
| | dRU7 26-tone [dRU15,dRU16] | | dRU8 26-tone [dRU17,dRU18] | | | |
| 106-tone dRU (i=1:4) | dRU1 26-tone [dRU1~4], [-10,10] | | dRU2 26-tone [dRU6~9], [-8,8] | | dRU3 26-tone [dRU10~13], [-9,9] | |
| | dRU4 26-tone [dRU15~18], [-7,7] | | | | | |
| 242-tone dRU (i=1:2) | dRU1 106-tone [dRU1~2], 26-tone dRU5, [-6,-4,4,6] | | dRU2 106-tone [dRU3~4], 26-tone dRU14, [-5,-3,3,5] | | | |

FIG. 23

Data and pilot subcarrier indices for distributed RUs (dRU) in a 40MHz EHT TB PPDU for 6GHz LPI

2400

| dRU type | | | | dRU index and subcarrier range | | |
|---|---|---|---|---|---|---|
| 26-tone dRU<br>i=1:18 | dRU1<br>[-236:18:-20, 20:18:236] | dRU2<br>[-227:18:-11, 11:18:227] | dRU3<br>[-232:18:-16, 16:18:232] | dRU4<br>[-223:18:-7, 7:18:223] | dRU5<br>[-228:18:-12, 12:18:228] | dRU6<br>[-234:18:-18, 18:18:234] |
| | dRU7<br>[-225:18:-9, 9:18:225] | dRU8<br>[-230:18:-14, 14:18:230] | dRU9<br>[-221:18:-5, 5:18:221] | dRU10<br>[-235:18:-19, 19:18:235] | dRU11<br>[-226:18:-10, 10:18:226] | dRU12<br>[-231:18:-15, 15:18:231] |
| | dRU13<br>[-222:18:-6, 6:18:222] | dRU14<br>[-219:18:-3, 3:18:219] | dRU15<br>[-233:18:-17, 17:18:233] | dRU16<br>[-224:18:-8, 8:18:224] | dRU17<br>[-229:18:-13, 13:18:229] | dRU18<br>[-220:18:-4, 4:18:220] |
| 52-tone dRU<br>i=1:8 | dRU1<br>26-tone [dRU1,dRU2] | | dRU2<br>26-tone [dRU3,dRU4] | | dRU3<br>26-tone [dRU6,dRU7] | |
| | dRU4<br>26-tone [dRU8,dRU9] | | dRU5<br>26-tone [dRU10,dRU11] | | dRU6<br>26-tone [dRU12,dRU13] | |
| | dRU7<br>26-tone [dRU15,dRU16] | | dRU8<br>26-tone [dRU17,dRU18] | | | |
| 106-tone dRU<br>i=1:4 | dRU1<br>26-tone [dRU1~4], [-241,241] | | dRU2<br>26-tone [dRU6~9], [-239,239] | | dRU3<br>26-tone [dRU10~13], [-240,240] | |
| | dRU4<br>26-tone [dRU15~18], [-238,238] | | | | | |
| 242-tone dRU<br>i=1:2 | dRU1<br>106-tone [dRU1~2], 26-tone dRU5, [-244,-243,243,244] | | dRU2<br>106-tone [dRU3~4], 26-tone dRU14, [-242,-240,240,242] | | | |

Data and pilot subcarrier indices for distributed RUs (dRU) in a 40MHz EHT TB PPDU for 6GHz LPI

| dRU type | dRU index and subcarrier range | | | | | |
|---|---|---|---|---|---|---|
| 26-tone dRU i=1:18 | dRU1 [-244:18:-28, 3:18:219] | dRU2 [-235:18:-19, 12:18:228] | dRU3 [-240:18:-24, 7:18:223] | dRU4 [-231:18:-15, 16:18:232] | dRU5 [-236:18:-20, 11:18:227] | dRU6 [-242:18:-26, 5:18:221] |
| | dRU7 [-233:18:-17, 14:18:230] | dRU8 [-238:18:-22, 9:18:225] | dRU9 [-229:18:-13, 18:18:234] | dRU10 [-243:18:-27, 4:18:220] | dRU11 [-234:18:-18, 13:18:229] | dRU12 [-239:18:-23, 8:18:224] |
| | dRU13 [-230:18:-14, 17:18:233] | dRU14 [-227:18:-11, 20:18:236] | dRU15 [-241:18:-25, 6:18:222] | dRU16 [-232:18:-16, 15:18:231] | dRU17 [-237:18:-21, 10:18:226] | dRU18 [-228:18:-12, 19:18:235] |
| 52-tone dRU i=1:8 | dRU1 26-tone [dRU1,dRU2] | dRU2 26-tone [dRU3,dRU4] | | dRU3 26-tone [dRU6,dRU7] | | |
| | dRU4 26-tone [dRU8,dRU9] | dRU5 26-tone [dRU10,dRU11] | | dRU6 26-tone [dRU12,dRU13] | | |
| | dRU7 26-tone [dRU15,dRU16] | dRU8 26-tone [dRU17,dRU18] | | | | |
| 106-tone dRU i=1:4 | dRU1 26-tone [dRU1~4]; [-10,3] | dRU2 26-tone [dRU6~9]; [-8,5] | | dRU3 26-tone [dRU10~13]; [-9,4] | | |
| | dRU4 26-tone [dRU15~18]; [-7,6] | | | | | |
| 242-tone dRU i=1:2 | dRU1 106-tone [dRU1~2]; 26-tone dRU5, [-6,-4,7,9] | dRU2 106-tone [dRU3~4]; 26-tone dRU14, [-5,-3,8,10] | | | | |

FIG. 25

Data and pilot subcarrier indices for distributed RUs (dRU) in a 40MHz EHT TB PPDU for 6GHz LPI

| dRU type | | | | dRU index and subcarrier range | | | |
|---|---|---|---|---|---|---|---|
| 26-tone dRU<br>i=1:18 | dRU1<br>[-236:18:-20, 3:18:219] | dRU2<br>[-227:18:-11, 12:18:228] | dRU3<br>[-232:18:-16, 7:18:223] | dRU4<br>[-223:18:-7, 16:18:232] | dRU5<br>[-228:18:-12, 11:18:227] | dRU6<br>[-234:18:-18, 5:18:221] |
| | dRU7<br>[-225:18:-9, 14:18:230] | dRU8<br>[-230:18:-14, 9:18:225] | dRU9<br>[-221:18:-5, 18:18:234] | dRU10<br>[-235:18:-19, 4:18:220] | dRU11<br>[-226:18:-10, 13:18:229] | dRU12<br>[-231:18:-15, 8:18:224] |
| | dRU13<br>[-222:18:-6, 17:18:233] | dRU14<br>[-219:18:-3, 20:18:236] | dRU15<br>[-233:18:-17, 6:18:222] | dRU16<br>[-224:18:-8, 15:18:231] | dRU17<br>[-229:18:-13, 10:18:226] | dRU18<br>[-220:18:-4, 19:18:235] |
| 52-tone dRU<br>i=1:8 | dRU1<br>26-tone [dRU1,dRU2] | | dRU2<br>26-tone [dRU3,dRU4] | | dRU3<br>26-tone [dRU6,dRU7] | |
| | dRU4<br>26-tone [dRU8,dRU9] | | dRU5<br>26-tone [dRU10,dRU11] | | dRU6<br>26-tone [dRU12,dRU13] | |
| | dRU7<br>26-tone [dRU15,dRU16] | | dRU8<br>26-tone [dRU17,dRU18] | | | |
| 106-tone dRU<br>i=1:4 | dRU1<br>26-tone [dRU1~4], [-241,237] | | dRU2<br>26-tone [dRU6~9], [-239,239] | | dRU3<br>26-tone [dRU10~13], [-240,238] | |
| | dRU4<br>26-tone [dRU15~18], [-238,240] | | | | | |
| 242-tone dRU<br>i=1:2 | dRU1<br>106-tone [dRU1~2], 26-tone dRU5, [-244,-243,241,244] | | dRU2<br>106-tone [dRU3~4], 26-tone dRU14, [-242,-240,242,244] | | | |

FIG. 26

Data and pilot subcarrier indices for distributed RUs (dRU) in a 80MHz EHT TB PPDU for 6GHz LPI

| dRU type | dRU index and subcarrier range | | |
|---|---|---|---|
| 26-tone dRU | dRU1 [-500:37:-56, 56:37:500] | dRU2 [-484:37:-40, 40:37:484] | dRU3 [-492:37:-48, 48:37:492] |
| | dRU7 [-480:37:-36, 36:37:480] | dRU8 [-488:37:-44, 44:37:488] | dRU9 [-472:37:-28, 28:37:472] |
| | dRU13 [-470:37:-26, 26:37:470] | dRU14 [-466:37:-22, 22:37:466] | dRU15 [-498:37:-54, 54:37:498] |
| | dRU19 [not defined] | dRU20 [-499:37:-55, 55:37:499] | dRU21 [-483:37:-39, 39:37:483] |
| | dRU25 [-495:37:-51, 51:37:495] | dRU26 [-479:37:-35, 35:37:479] | dRU27 [-487:37:-43, 43:37:487] |
| | dRU31 [-485:37:-41, 41:37:485] | dRU32 [-469:37:-25, 25:37:469] | dRU33 [-465:37:-21, 21:37:465] |
| | dRU37 [-473:37:-29, 29:37:473] | | |

FIG. 27A

Data and pilot subcarrier indices for distributed RUs (dRU) in a 80MHz EHT TB PPDU for 6GHz LPI

| dRU type | | dRU index and subcarrier range | | |
|---|---|---|---|---|
| 26-tone dRU | dRU4 [-476:37:-32, 32:37:476] | dRU5 [-468:37:-24, 24:37:468] | dRU6 [-496:37:-52, 52:37:496] | |
| | dRU10 [-494:37:-50, 50:37:494] | dRU11 [-478:37:-34, 34:37:478] | dRU12 [-486:37:-42, 42:37:486] | |
| | dRU16 [-482:37:-38, 38:37:482] | dRU17 [-490:37:-46, 46:37:490] | dRU18 [-474:37:-30, 30:37:474] | |
| | dRU22 [-491:37:-47, 47:37:491] | dRU23 [-475:37:-31, 31:37:475] | dRU24 [-467:37:-23, 23:37:467] | |
| | dRU28 [-471:37:-27, 27:37:471] | dRU29 [-493:37:-49, 49:37:493] | dRU30 [-477:37:-33, 33:37:477] | |
| | dRU34 [-497:37:-53, 53:37:497] | dRU35 [-481:37:-37, 37:37:481] | dRU36 [-489:37:-45, 45:37:489] | |

FIG. 27B

| dRU type | dRU index and subcarrier range | | | |
|---|---|---|---|---|
| | dRU1 | dRU2 | dRU3 | dRU4 |
| 52-tone dRU i=1:16 | 26-tone [dRU1,dRU2] | 26-tone [dRU3,dRU4] | 26-tone [dRU5,dRU6] | 26-tone [dRU8,dRU9] |
| | dRU7 | dRU8 | dRU9 | dRU10 |
| | 26-tone [dRU15,dRU16] | 26-tone [dRU17,dRU18] | 26-tone [dRU20,dRU21] | 26-tone [dRU22,dRU23] |
| | dRU13 | dRU14 | dRU15 | dRU16 |
| | 26-tone [dRU29,dRU30] | 26-tone [dRU31,dRU32] | 26-tone [dRU34,dRU35] | 26-tone [dRU36,dRU37] |
| 106-tone dRU i=1:8 | dRU1 | dRU2 | dRU3 | dRU4 |
| | 26-tone [dRU1~4], [-19,19] | 26-tone [dRU6~9], [-15,15] | 26-tone [dRU10~13], [-13,13] | 26-tone [dRU15~18], [-17,17] |
| | dRU7 | dRU8 | | |
| | 26-tone [dRU29~32], [-12,12] | 26-tone [dRU34~37], [-16,16] | | |
| 242-tone dRU i=1:4 | dRU1 | | dRU2 | |
| | 106-tone [dRU1~2], [-11,-7,7,11], 26-tone dRU5 | | 106-tone [dRU3~4], [-9,-5,5,9], 26-tone dRU14 | |
| | dRU4 | | | |
| | 106-tone [dRU7~8], [-8,-4,4,8], 26-tone dRU33 | | | |
| 484-tone dRU i=1:2 | dRU1 | | dRU2 | |
| | 242-tone [dRU1~2] | | 242-tone [dRU3~4] | |

Data and pilot subcarrier indices for distributed RUs (dRU) in a 80MHz EHT TB PPDU for 6GHz LPI

Data and pilot subcarrier indices for distributed RUs (dRU) in a 80MHz EHT TB PPDU for 6GHz LPI

| dRU type | dRU index and subcarrier range | | | |
|---|---|---|---|---|
| 52-tone dRU i=1:16 | dRU5 26-tone [dRU10,dRU11] | dRU6 26-tone [dRU12,dRU13] | | |
| | dRU11 26-tone [dRU25,dRU26] | dRU12 26-tone [dRU27,dRU28] | | |
| 106-tone dRU i=1:8 | dRU5 26-tone [dRU20~23],[-18,18] | dRU6 26-tone [dRU25~28],[-14,14] | | |
| 242-tone dRU i=1:4 | dRU3 106-tone [dRU5~6], [-10,-6,6,10], 26-tone dRU24 | | | |
| 484-tone dRU i=1:2 | | | | |

Data and pilot subcarrier indices for distributed RUs (dRU) in a 80MHz EHT TB PPDU for 6GHz LPI

| dRU type | dRU index and subcarrier range | | | | | |
|---|---|---|---|---|---|---|
| 26-tone dRU | dRU1 [-483:37:-39, 39:37:483] | dRU2 [-467:37:-23, 23:37:467] | dRU3 [-475:37:-31, 31:37:475] | | | |
| | dRU7 [-463:37:-19, 19:37:463] | dRU8 [-471:37:-27, 27:37:471] | dRU9 [-455:37:-11, 11:37:455] | | | |
| | dRU13 [-453:37:-9, 9:37:453] | dRU14 [-449:37:-5, 5:37:449] | dRU15 [-481:37:-37, 37:37:481] | | | |
| | dRU19 [not defined] | dRU20 [-482:37:-38, 38:37:482] | dRU21 [-466:37:-22, 22:37:466] | | | |
| | dRU25 [-478:37:-34, 34:37:478] | dRU26 [-462:37:-18, 18:37:462] | dRU27 [-470:37:-26, 26:37:470] | | | |
| | dRU31 [-468:37:-24, 24:37:468] | dRU32 [-452:37:-8, 8:37:452] | dRU33 [-448:37:-4, 4:37:448] | | | |
| | dRU37 [-456:37:-12, 12:37:456] | | | | | |

Data and pilot subcarrier indices for distributed RUs (dRU) in a 80MHz EHT TB PPDU for 6GHz LPI

| dRU type | dRU index and subcarrier range | | |
|---|---|---|---|
| 26-tone dRU | dRU4<br>[-459:37:-15, 15:37:459] | dRU5<br>[-451:37:-7, 7:37:451] | dRU6<br>[-479:37:-35, 35:37:479] |
| | dRU10<br>[-477:37:-33, 33:37:477] | dRU11<br>[-461:37:-17, 17:37:461] | dRU12<br>[-469:37:-25, 25:37:469] |
| | dRU16<br>[-465:37:-21, 21:37:465] | dRU17<br>[-473:37:-29, 29:37:473] | dRU18<br>[-457:37:-13, 13:37:457] |
| | dRU22<br>[-474:37:-30, 30:37:474] | dRU23<br>[-458:37:-14, 14:37:458] | dRU24<br>[-450:37:-6, 6:37:450] |
| | dRU28<br>[-454:37:-10, -10:37:454] | dRU29<br>[-476:37:-32, 32:37:476] | dRU30<br>[-460:37:-16, 16:37:460] |
| | dRU34<br>[-480:37:-36, 36:37:480] | dRU35<br>[-464:37:-20, 20:37:464] | dRU36<br>[-472:37:-28, 28:37:472] |

FIG. 28B

Data and pilot subcarrier indices for distributed RUs (dRU) in a 80MHz EHT TB PPDU for 6GHz LPI

| dRU type | dRU index and subcarrier range | | | |
|---|---|---|---|---|
| 52-tone dRU<br>i=1:16 | dRU1<br>26-tone [dRU1,dRU2] | dRU2<br>26-tone [dRU3,dRU4] | dRU3<br>26-tone [dRU6,dRU7] | dRU4<br>26-tone [dRU8,dRU9] |
| | dRU7<br>26-tone [dRU15,dRU16] | dRU8<br>26-tone [dRU17,dRU18] | dRU9<br>26-tone [dRU20,dRU21] | dRU10<br>26-tone [dRU22,dRU23] |
| | dRU13<br>26-tone [dRU29,dRU30] | dRU14<br>26-tone [dRU31,dRU32] | dRU15<br>26-tone [dRU34,dRU35] | dRU16<br>26-tone [dRU36,dRU37] |
| 106-tone dRU<br>i=1:8 | dRU1<br>26-tone [dRU1~4], [-496,496] | dRU2<br>26-tone [dRU6~9], [-492,492] | dRU3<br>26-tone [dRU10~13],[-490,490] | dRU4<br>26-tone [dRU15~18],[-494,494] |
| | dRU7<br>26-tone [dRU29~32],[-489,489] | dRU8<br>26-tone [dRU34~37],[-493,493] | | |
| 242-tone dRU<br>i=1:4 | dRU1<br>106-tone [dRU1~2],[-500,-488,488,500], 26-tone dRU5 | | dRU2<br>106-tone [dRU3~4], [-498,-486,486,498], 26-tone dRU14 | |
| | dRU4<br>106-tone [dRU7~8], [-497,-485,485,497], 26-tone dRU33 | | | |
| 484-tone dRU<br>i=1:2 | dRU1<br>242-tone [dRU1~2] | | dRU2<br>242-tone [dRU3~4] | |

Data and pilot subcarrier indices for distributed RUs (dRU) in a 80MHz EHT TB PPDU for 6GHz LPI

| dRU type | dRU index and subcarrier range | |
|---|---|---|
| 52-tone dRU i=1:16 | dRU5 26-tone [dRU10,dRU11] | dRU6 26-tone [dRU12,dRU13] |
| | dRU11 26-tone [dRU25,dRU26] | dRU12 26-tone [dRU27,dRU28] |
| 106-tone dRU i=1:8 | dRU5 26-tone [dRU20~23], [-495,495] | dRU6 26-tone [dRU25~28], [-491,491] |
| 242-tone dRU i=1:4 | dRU3 106-tone [dRU5~6],[-499,-487,487,499], 26-tone dRU24 | |
| 484-tone dRU i=1:2 | | |

FIG. 28D

Data and pilot subcarrier indices for distributed RUs (dRU) in a 80MHz EHT TB PPDU for 6GHz LPI

| dRU type | dRU index and subcarrier range | | |
|---|---|---|---|
| 26-tone dRU | dRU1<br>[-500:37:-56, 3:37:447] | dRU2<br>[-484:37:-40, 19:37:463] | dRU3<br>[-492:37:-48, 11:37:455] |
| | dRU7<br>[-480:37:-36, 23:37:467] | dRU8<br>[-488:37:-44, 15:37:459] | dRU9<br>[-472:37:-28, 31:37:475] |
| | dRU13<br>[-470:37:-26, 33:37:477] | dRU14<br>[-466:37:-22, 37:37:481] | dRU15<br>[-498:37:-54, 5:37:449] |
| | dRU19<br>[not defined] | dRU20<br>[-499:37:-55, 4:37:448] | dRU21<br>[-483:37:-39, 20:37:464] |
| | dRU25<br>[-495:37:-51, 8:37:452] | dRU26<br>[-479:37:-35, 24:37:468] | dRU27<br>[-487:37:-43, 16:37:460] |
| | dRU31<br>[-485:37:-41, 18:37:462] | dRU32<br>[-469:37:-25, 34:37:478] | dRU33<br>[-465:37:-21, 38:37:482] |
| | dRU37<br>[-473:37:-29, 30:37:474] | | |

2900

Data and pilot subcarrier indices for distributed RUs (dRU) in a 80MHz EHT TB PPDU for 6GHz LPI

| dRU type | dRU index and subcarrier range | | |
|---|---|---|---|
| 26-tone dRU | dRU4<br>[-476:37:-32, 27:37:471] | dRU5<br>[-468:37:-24, 35:37:479] | dRU6<br>[-496:37:-52, 7:37:451] |
| | dRU10<br>[-494:37:-50, 9:37:453] | dRU11<br>[-478:37:-34, 25:37:469] | dRU12<br>[-486:37:-42, 17:37:461] |
| | dRU16<br>[-482:37:-38, 21:37:465] | dRU17<br>[-490:37:-46, 13:37:457] | dRU18<br>[-474:37:-30, 29:37:473] |
| | dRU22<br>[-491:37:-47, 12:37:456] | dRU23<br>[-475:37:-31, 28:37:472] | dRU24<br>[-467:37:-23, 36:37:480] |
| | dRU28<br>[-471:37:-27, 32:37:476] | dRU29<br>[-493:37:-49, 10:37:454] | dRU30<br>[-477:37:-33, 26:37:470] |
| | dRU34<br>[-497:37:-53, 6:37:450] | dRU35<br>[-481:37:-37, 22:37:466] | dRU36<br>[-489:37:-45, 14:37:458] |

Data and pilot subcarrier indices for distributed RUs (dRU) in a 80MHz EHT TB PPDU for 6GHz LPI

| dRU type | dRU index and subcarrier range | | | |
|---|---|---|---|---|
| 52-tone dRU i=1:16 | dRU1 26-tone [dRU1,dRU2] | dRU2 26-tone [dRU3,dRU4] | dRU3 26-tone [dRU6,dRU7] | dRU4 26-tone [dRU8,dRU9] |
| | dRU7 26-tone [dRU15,dRU16] | dRU8 26-tone [dRU17,dRU18] | dRU9 26-tone [dRU20,dRU21] | dRU10 26-tone [dRU22,dRU23] |
| | dRU13 26-tone [dRU29,dRU30] | dRU14 26-tone [dRU31,dRU32] | dRU15 26-tone [dRU34,dRU35] | dRU16 26-tone [dRU36,dRU37] |
| 106-tone dRU i=1:8 | dRU1 26-tone [dRU1~4], [-19,3] | dRU2 26-tone [dRU6~9], [-15,7] | dRU3 26-tone [dRU10~13],[-13,9] | dRU4 26-tone [dRU15~18],[-17,5] |
| | dRU7 26-tone [dRU29~32],[-12,10] | dRU8 26-tone [dRU34~37],[-16,6] | | |
| 242-tone dRU i=1:4 | dRU1 106-tone [dRU1~2]; [-11,-7,11,15], 26-tone dRU5 | | dRU2 106-tone [dRU3~4]; [-9,-5,13,17], 26-tone dRU14 | |
| | dRU4 106-tone [dRU7~8]; [-8,-4,14,18], 26-tone dRU33 | | | |
| 484-tone dRU i=1:2 | dRU1 242-tone [dRU1~2] | | dRU2 242-tone [dRU3~4] | |

FIG. 29C

Data and pilot subcarrier indices for distributed RUs (dRU) in a 80MHz EHT TB PPDU for 6GHz LPI

| dRU type | dRU index and subcarrier range | | | |
|---|---|---|---|---|
| 52-tone dRU i=1:16 | dRU5<br>26-tone [dRU10,dRU11] | dRU6<br>26-tone [dRU12,dRU13] | | |
| | dRU11<br>26-tone [dRU25,dRU26] | dRU12<br>26-tone [dRU27,dRU28] | | |
| 106-tone dRU i=1:8 | dRU5<br>26-tone [dRU20~23],[-18,4] | dRU6<br>26-tone [dRU25~28],[-14,8] | | |
| 242-tone dRU i=1:4 | dRU3<br>106-tone [dRU5~6],[-10,-6, 12,16], 26-tone dRU24 | | | |
| 484-tone dRU i=1:2 | | | | |

FIG. 29D

Data and pilot subcarrier indices for distributed RUs (dRU) in a 80MHz EHT TB PPDU for 6GHz LPI

| dRU type | dRU index and subcarrier range | | |
|---|---|---|---|
| 26-tone dRU | dRU1<br>[-483:37:-39, 3:37:447] | dRU2<br>[-467:37:-23, 19:37:463] | dRU3<br>[-475:37:-31, 11:37:455] |
| | dRU7<br>[-463:37:-19, 23:37:467] | dRU8<br>[-471:37:-27, 15:37:459] | dRU9<br>[-455:37:-11, 31:37:475] |
| | dRU13<br>[-453:37:-9, 33:37:477] | dRU14<br>[-449:37:-5, 37:37:481] | dRU15<br>[-481:37:-37, 5:37:449] |
| | dRU19<br>[not defined] | dRU20<br>[-482:37:-38, 4:37:448] | dRU21<br>[-466:37:-22, 20:37:464] |
| | dRU25<br>[-478:37:-34, 8:37:452] | dRU26<br>[-462:37:-18, 24:37:468] | dRU27<br>[-470:37:-26, 16:37:460] |
| | dRU31<br>[-468:37:-24, 18:37:462] | dRU32<br>[-452:37:-8, 34:37:478] | dRU33<br>[-448:37:-4, 38:37:482] |
| | dRU37<br>[-456:37:-12, 30:37:474] | | |

Data and pilot subcarrier indices for distributed RUs (dRU) in a 80MHz EHT TB PPDU for 6GHz LPI

| dRU type | dRU index and subcarrier range | | |
|---|---|---|---|
| | dRU4<br>[-459:37:-15, 27:37:471] | dRU5<br>[-451:37:-7, 35:37:479] | dRU6<br>[-479:37:-35, 7:37:451] |
| | dRU10<br>[-477:37:-33, 9:37:453] | dRU11<br>[-461:37:-17, 25:37:469] | dRU12<br>[-469:37:-25, 17:37:461] |
| | dRU16<br>[-465:37:-21, 21:37:465] | dRU17<br>[-473:37:-29, 13:37:457] | dRU18<br>[-457:37:-13, 29:37:473] |
| 26-tone dRU | dRU22<br>[-474:37:-30, 12:37:456] | dRU23<br>[-458:37:-14, 28:37:472] | dRU24<br>[-450:37:-6, 36:37:480] |
| | dRU28<br>[-454:37:-10, -32:37:476] | dRU29<br>[-476:37:-32, 10:37:454] | dRU30<br>[-460:37:-16, 26:37:470] |
| | dRU34<br>[-480:37:-36, 6:37:450] | dRU35<br>[-464:37:-20, 22:37:466] | dRU36<br>[-472:37:-28, 14:37:458] |

FIG. 30B

Data and pilot subcarrier indices for distributed RUs (dRU) in a 80MHz EHT TB PPDU for 6GHz LPI

| dRU type | dRU index and subcarrier range | | | |
|---|---|---|---|---|
| 52-tone dRU <br> i=1:16 | dRU1 <br> 26-tone [dRU1,dRU2] | dRU2 <br> 26-tone [dRU3,dRU4] | dRU3 <br> 26-tone [dRU5,dRU6] | dRU4 <br> 26-tone [dRU7,dRU8] |
| | dRU7 <br> 26-tone [dRU15,dRU16] | dRU8 <br> 26-tone [dRU17,dRU18] | dRU9 <br> 26-tone [dRU19,dRU20] | dRU10 <br> 26-tone [dRU21,dRU22] |
| | dRU13 <br> 26-tone [dRU25,dRU26] | dRU14 <br> 26-tone [dRU27,dRU28] | dRU15 <br> 26-tone [dRU29,dRU30] | dRU16 <br> 26-tone [dRU31,dRU32] |
| 106-tone dRU <br> i=1:8 | dRU1 <br> 26-tone [dRU1~4], [-496,484] | dRU2 <br> 26-tone [dRU5~8], [-492,488] | dRU3 <br> 26-tone [dRU9~12], [-490,490] | dRU4 <br> 26-tone [dRU13~16], [-494,486] |
| | dRU7 <br> 26-tone [dRU25~28],[-489,491] | dRU8 <br> 26-tone [dRU29~32],[-493,487] | | |
| 242-tone dRU <br> i=1:4 | dRU1 <br> 106-tone [dRU1~2],[-500,-488,492,496], 26-tone dRU5 | | dRU2 <br> 106-tone [dRU3~4], [-498,-486,494,498], 26-tone dRU6 | |
| | dRU4 <br> 106-tone [dRU7~8], [-497,-485,495,499], 26-tone dRU7 | | 5 | |
| 484-tone dRU <br> i=1:2 | dRU1 <br> 242-tone [dRU1~2] | | dRU2 <br> 242-tone [dRU3~4] | |

Data and pilot subcarrier indices for distributed RUs (dRU) in a 80MHz EHT TB PPDU for 6GHz LPI

| dRU type | dRU index and subcarrier range | | |
|---|---|---|---|
| 52-tone dRU<br>i=1:16 | dRU5<br>26-tone [dRU10,dRU11] | dRU6<br>26-tone [dRU12,dRU13] | |
| | dRU11<br>26-tone [dRU25,dRU26] | dRU12<br>26-tone [dRU27,dRU28] | |
| 106-tone dRU<br>i=1:8 | dRU5<br>26-tone [dRU20~23],<br>[-495, 485] | dRU6<br>26-tone [dRU25~28],<br>[-491, 489] | |
| 242-tone dRU<br>i=1:4 | dRU3<br>106-tone [dRU5~6],[-499,-487,493,497], 26-tone dRU24 | | |
| 484-tone dRU<br>i=1:2 | | | |

DISTRIBUTE FREQUENCY TONES OF A RESOURCE UNIT (RU) OVER A DISTRIBUTION BANDWIDTH AS A DISTRIBUTED-TONE RU (dRU)
3210

GENERATE A PLURALITY OF SUBCARRIER INDICES FOR THE DISTRIBUTED-TONE RU SUCH THAT A DISTRIBUTION OF THE DISTRIBUTED-TONE RU IS SYMMETRIC TO A DIRECT-CURRENT (DC) TONE ALONG AN AXIS OF SUBCARRIER INDICES
3220

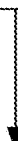

COMMUNICATE WIRELESSLY USING THE DISTRIBUTED-TONE RU IN A 6GHZ LOW-POWER INDOOR (LPI) SYSTEM
3230

```
┌─────────────────────────────────────────────┐
│ DISTRIBUTE FREQUENCY TONES OF A RESOURCE UNIT (RU) │
│ OVER A DISTRIBUTION BANDWIDTH AS A DISTRIBUTED-TONE │
│                    RU (DRU)                         │
│                     3310                            │
└─────────────────────────────────────────────┘
                        │
                        ▼
┌─────────────────────────────────────────────┐
│ GENERATE A PLURALITY OF SUBCARRIER INDICES FOR THE  │
│ DISTRIBUTED-TONE RU SUCH THAT A DISTRIBUTION OF THE │
│ DISTRIBUTED-TONE RU IS ASYMMETRIC TO A DIRECT-      │
│ CURRENT (DC) TONE ALONG AN AXIS OF SUBCARRIER       │
│                   INDICES                           │
│                    3320                             │
└─────────────────────────────────────────────┘
                        │
                        ▼
┌─────────────────────────────────────────────┐
│ COMMUNICATE WIRELESSLY USING THE DISTRIBUTED-       │
│ TONE RU IN A 6GHZ LOW-POWER INDOOR (LPI)            │
│                   SYSTEM                            │
│                    3330                             │
└─────────────────────────────────────────────┘
```

FIG. 33

SUBCARRIER INDICES FOR DISTRIBUTED-TONE RESOURCE UNITS IN 6GHZ LOW-POWER INDOOR SYSTEMS

CROSS REFERENCE TO RELATED PATENT APPLICATION

The present disclosure is part of a non-provisional patent application claiming the priority benefit of U.S. Provisional Patent Application Nos. 63/107,551 and 63/150,154, filed 30 Oct. 2020 and 17 Feb. 2021, respectively, the contents of which being incorporated by reference in their entirety.

TECHNICAL FIELD

The present disclosure is generally related to wireless communications and, more particularly, to subcarrier indices for distributed-tone resource units (dRUs) in 6 GHz low-power indoor (LPI) systems.

BACKGROUND

Unless otherwise indicated herein, approaches described in this section are not prior art to the claims listed below and are not admitted as prior art by inclusion in this section.

Under current regulations by the Federal Communications Commission (FCC) regarding wireless communications in the 2.4-GHz and 5-GHz bands, the equivalent isotropically radiated power (EIRP) of a power spectral density (PSD) limit is capped at 20 dBm for 2-MHz transmission and the transmission (Tx) power limit is capped at 30 dBm. With a reasonable Tx power assumption, the FCC requirement would not limit Tx power for narrow-bandwidth transmissions. On the other hand, the FCC requirement regarding 6-GHz LPI applications is far more stringent than PSD requirement for the 2.4-GHz and 5-GHz bands. For instance, the EIRP limit is at 5 dBm/MHz for an access point (AP) in 6-GHz LPI versus an EIRP limit of 17 dBm/MHz for APs in the 5-GHz band. Similarly, the EIRP limit is at −1 dBm/MHz for an non-AP in 6-GHz LPI versus an EIRP limit of 11 dBm/MHz for APs in the 5-GHz band. As there can be different sizes of distributed-tone (or interleaved-tone) RUs in different bandwidths, how subcarrier indices are assigned or otherwise distributed remains to be defined. Therefore, there is a need for a solution for subcarrier indices for distributed-tone RUs in 6 GHz LPI systems.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to subcarrier indices for distributed-tone RUs in 6 GHz LPI systems. It is believed that the distributed-tone (or interleaved-tone) RU with the subcarrier indices generated under one or more of the schemes proposed herein may achieve an optimal performance in terms of number of tones in 1 MHz, allow flexible scheduling for allocation of distributed-tone RU of any size (with no constraints or limitation), and support distributed-tone multi-RUs (dMRUs) such as dMRU(26+52) and dMRU(26+106).

In one aspect, a method may involve distributing frequency tones of a RU over a distribution bandwidth as a distributed-tone RU. The method may also involve generating a plurality of subcarrier indices for the distributed-tone RU such that a distribution of the distributed-tone RU is symmetric to a direct-current (DC) tone along an axis of subcarrier indices. The method may further involve communicating wirelessly using the interleaved-tone RU in a 6 GHz LPI system.

In another aspect, a method may involve distributing frequency tones of a RU over a distribution bandwidth as a distributed-tone RU. The method may also involve generating a plurality of subcarrier indices for the distributed-tone RU such that a distribution of the distributed-tone RU is asymmetric to a DC tone along an axis of subcarrier indices. The method may further involve communicating wirelessly using the distributed-tone RU in a 6 GHz LPI system.

It is noteworthy that, although description provided herein may be in the context of certain radio access technologies, networks and network topologies such as, Wi-Fi, the proposed concepts, schemes and any variation(s)/derivative(s) thereof may be implemented in, for and by other types of radio access technologies, networks and network topologies such as, for example and without limitation, Bluetooth, ZigBee, $5^{th}$ Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

FIG. 4 is a diagram of an example design in accordance with an implementation of the present disclosure.

FIG. 6 is a diagram of an example design in accordance with an implementation of the present disclosure.

FIG. 7 is a diagram of an example design in accordance with an implementation of the present disclosure.

FIG. 8A and FIG. 8B each is a diagram of a respective portion of an example design in accordance with an implementation of the present disclosure.

FIG. 9A and FIG. 9B each is a diagram of a respective portion of an example design in accordance with an implementation of the present disclosure.

FIG. 10 is a diagram of an example design in accordance with an implementation of the present disclosure.

FIG. 11 is a diagram of an example design in accordance with an implementation of the present disclosure.

FIG. 12 is a diagram of an example design in accordance with an implementation of the present disclosure.

FIG. 13 is a diagram of an example design in accordance with an implementation of the present disclosure.

FIG. 14 is a diagram of an example design in accordance with an implementation of the present disclosure.

FIG. 16 is a diagram of an example design in accordance with an implementation of the present disclosure.

FIG. 17 is a diagram of an example design in accordance with an implementation of the present disclosure.

FIG. 18 is a diagram of an example design in accordance with an implementation of the present disclosure.

FIG. 19 is a diagram of an example design in accordance with an implementation of the present disclosure.

FIG. 20 is a diagram of an example design in accordance with an implementation of the present disclosure.

FIG. 21 is a diagram of an example design in accordance with an implementation of the present disclosure.

FIG. 22 is a diagram of an example design in accordance with an implementation of the present disclosure.

FIG. 23 is a diagram of an example design in accordance with an implementation of the present disclosure.

FIG. 24 is a diagram of an example design in accordance with an implementation of the present disclosure.

FIG. 25 is a diagram of an example design in accordance with an implementation of the present disclosure.

FIG. 26 is a diagram of an example design in accordance with an implementation of the present disclosure.

FIG. 27A, FIG. 27B, FIG. 27C and FIG. 27D each is a diagram of an example design in accordance with an implementation of the present disclosure.

FIG. 28A, FIG. 28B, FIG. 28C and FIG. 28D each is a diagram of an example design in accordance with an implementation of the present disclosure.

FIG. 29A, FIG. 29B, FIG. 29C and FIG. 29D each is a diagram of an example design in accordance with an implementation of the present disclosure.

FIG. 30A, FIG. 30B, FIG. 30C and FIG. 30D each is a diagram of an example design in accordance with an implementation of the present disclosure.

FIG. 32 is a flowchart of an example process in accordance with an implementation of the present disclosure.

FIG. 33 is a flowchart of an example process in accordance with an implementation of the present disclosure.

DETAILED DESCRIPTION OF PREFERRED EMBODIMENTS

Figure 1:
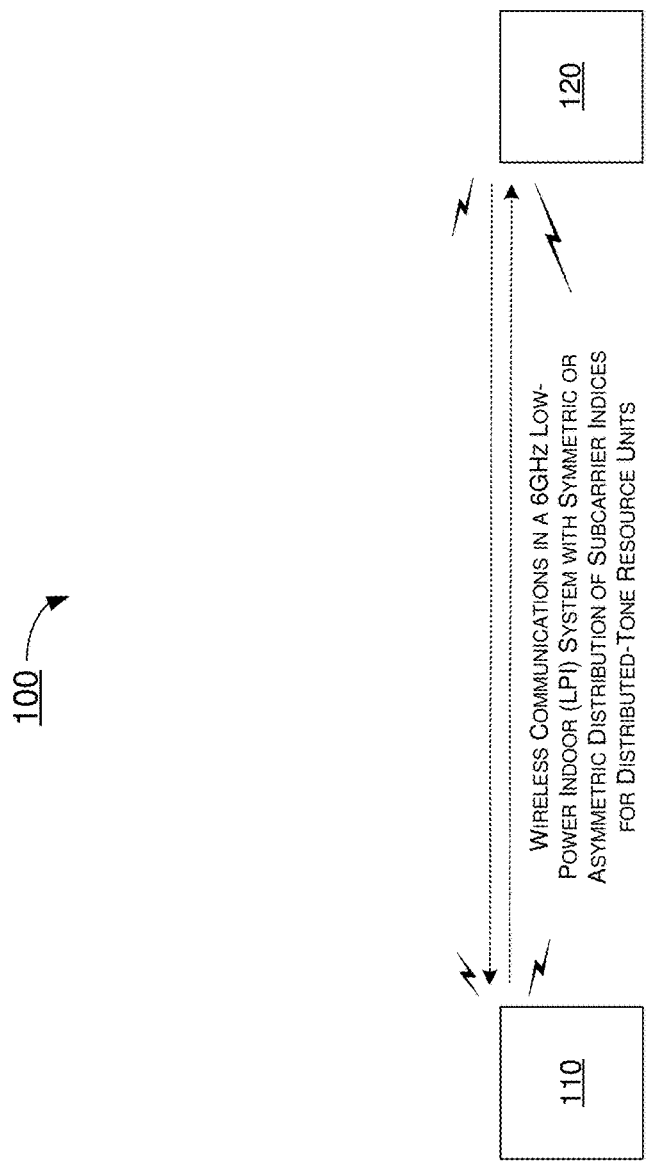
FIG. 1 is a diagram of an example network environment in which various solutions and schemes in accordance with the present disclosure may be implemented.

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to subcarrier indices for distributed-tone RUs in 6 GHz LPI systems. According to the present disclosure, a number of possible solutions may be implemented separately or jointly. That is, although these possible solutions may be described below separately, two or more of these possible solutions may be implemented in one combination or another.

It is noteworthy that, in the present disclosure, a 26-tone regular RU may be interchangeably denoted as RU26 (or rRU26), a 52-tone regular RU may be interchangeably denoted as RU52 (or rRU52), a 106-tone regular RU may be interchangeably denoted as RU106 (or rRU106), a 242-tone regular RU may be interchangeably denoted as RU242 (or rRU242), and so on. Moreover, an aggregate (26+52)-tone regular MRU may be interchangeably denoted as MRU78 (or rMRU78), an aggregate (26+106)-tone regular MRU may be interchangeably denoted as MRU132 (or rMRU132), and so on. Furthermore, in the present disclosure, a 26-tone distributed-tone RU may be interchangeably denoted as dRU26, a 52-tone distributed-tone RU may be interchangeably denoted as dRU52, a 106-tone distributed-tone RU may be interchangeably denoted as dRU106, a 242-tone distributed-tone RU may be interchangeably denoted as dRU242, and so on. Additionally, an aggregate (26+52)-tone distributed-tone MRU may be interchangeably denoted as dMRU78, an aggregate (26+106)-tone distributed-tone MRU may be interchangeably denoted as dMRU132, and so on. Since the above examples are merely illustrative examples and not an exhaustive listing of all possibilities, the same applies to regular RUs, distributed-tone RUs, MRUs, and distributed-tone MRUs of different sizes (or different number of tones). It is also noteworthy that, in the present disclosure, a bandwidth of 20 MHz may be interchangeably denoted as BW20, a bandwidth of 40 MHz may be interchangeably denoted as BW40, a bandwidth of 80 MHz may be interchangeably denoted as BW80, a bandwidth of 160 MHz may be interchangeably denoted as BW160, a bandwidth of 240 MHz may be interchangeably denoted as BW240, and a bandwidth of 320 MHz may be interchangeably denoted as BW320. It is further noteworthy that, in the present disclosure, a 26-tone interleaved-tone RU may be interchangeably denoted as iRU26, a 52-tone interleaved-tone RU may be interchangeably denoted as iRU52, a 106-tone interleaved-tone RU may be interchangeably denoted as iRU106, a 242-tone interleaved-tone RU may be interchangeably denoted as iRU242, and a 484-tone interleaved-tone RU may be interchangeably denoted as iRU484.

FIG. 1 illustrates an example network environment 100 in which various solutions and schemes in accordance with the present disclosure may be implemented. FIG. 2~FIG. 33 illustrate examples of implementation of various proposed schemes in network environment 100 in accordance with the present disclosure. The following description of various proposed schemes is provided with reference to FIG. 1~FIG. 33.

Referring to FIG. 1, network environment 100 may involve a communication entity 110 and a communication entity 120 communicating wirelessly (e.g., in a WLAN in accordance with one or more IEEE 802.11 standards). For instance, communication entity 110 may be a first STA and communication entity 120 may be a second STA, with each of the first STA and second STA functioning an access point (AP) STA or a non-AP STA. Under various proposed schemes in accordance with the present disclosure, communication entity 110 and communication entity 120 may be configured to communicate wirelessly with subcarrier indices for distributed-tone RUs in 6 GHz LPI systems, as described herein.

Under various proposed schemes in accordance with the present disclosure, subcarrier indices may be specified in tables (e.g., in a style similar to that for regular RUs in IEEE 802.11ax/be) for different distributed-tone RU (dRU) sizes in different bandwidths (BWs). Under the various proposed schemes, both guard tones and DC tones may be taken into account in table formulation for the subcarrier indices for distributed-tone (or interleaved-tone) RUs. It is believed that the distributed-tone RUs with the subcarrier indices proposed herein may result in a number of benefits, including, for example: achieving the optimal performance in terms of number of tones in 1 MHz, allowing flexible scheduling for allocation of dRU (or iRU) of any size (e.g., no constraint or limitation), support of distributed tone aggregation of multiple RUs (MRU) such as MRU(26+52) and MRU(26+106) to achieve optimal performance.

Under one proposed scheme in accordance with the present disclosure, there may be two design options for the subcarrier indices. In a first option (Option 1), dRU tone distributions may be symmetric to DC tone(s). In a second option (Option 2), dRU tone distributions may be asymmetric to the DC tone(s). Under another proposed scheme in accordance with the present disclosure, there may be two options for pilot indices for distributed-tone RUs. In a first option (Option A), relative pilot positions, as with regular RUs with respect to a first left-hand tone, may be preserved. In a second option (Option B), pilot tones may be assigned with symmetry to the DC tone.

Figure 2:
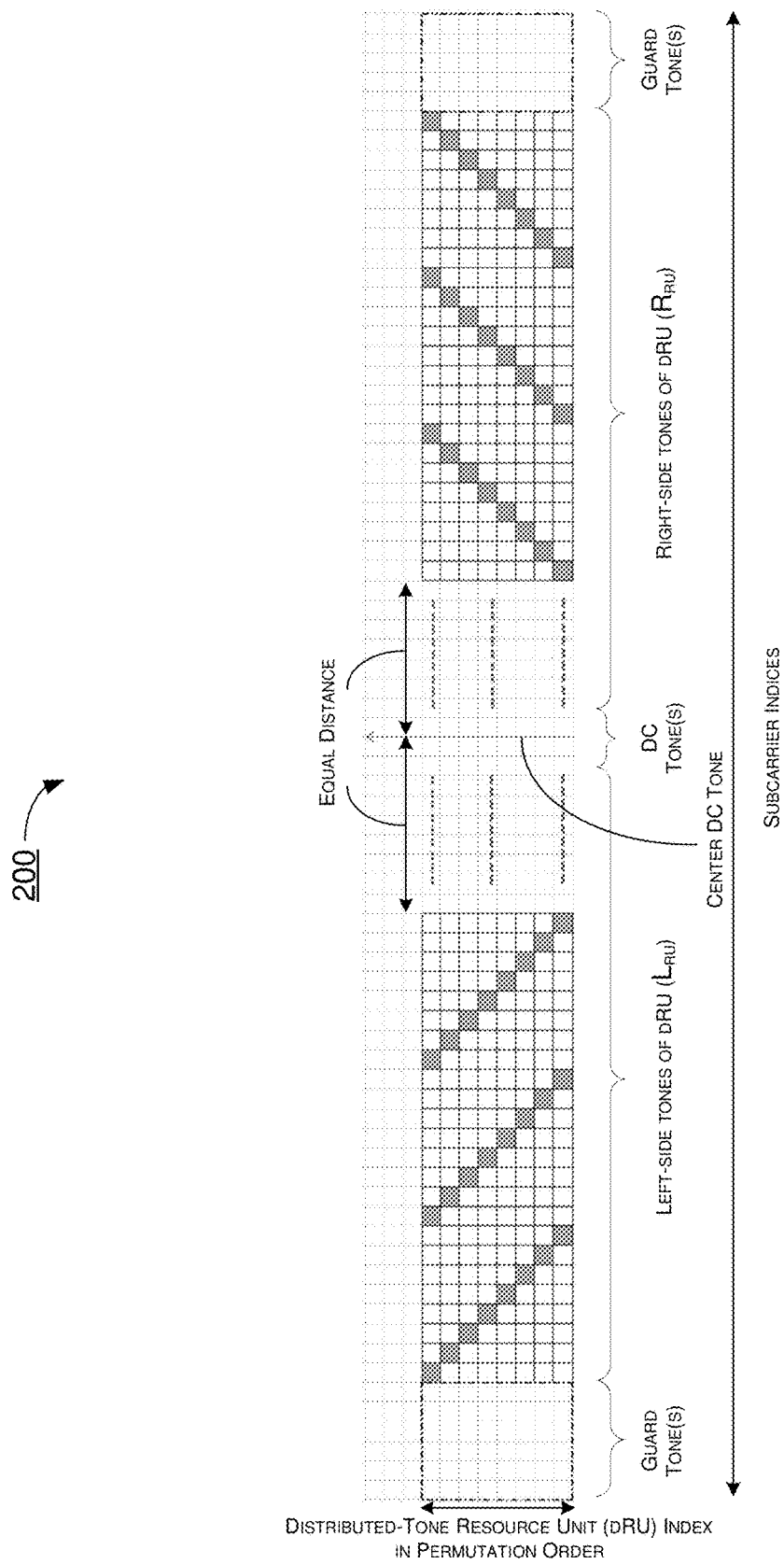
FIG. 2 is a diagram of an example design in accordance with an implementation of the present disclosure.

FIG. 2 illustrates an example design 200 in accordance with an implementation of Option 1 under the proposed scheme. Design 200 pertains to assignment or distribution of subcarrier indices for distributed-tone RUs with the distributed-tone RUs being distributed in a symmetric fashion relative to one or more DC tones. As shown in FIG. 2, in Option 1, dRU tone distributions may be symmetric to a number of DC tones, with a horizontal axis being subcarrier indices and a vertical axis being distributed-tone RU (dRU) index in a permutation order. In design 200, each dRU may include a left-side portion ($L_{ru}$) and a right-side portion ($R_{ru}$) relative to a center DC tone among one or more DC tones. The distribution of $L_{ru}$ and $R_{ru}$ may be symmetric to the center DC tone in two ways. Firstly, the center DC tone is located symmetrically in the middle between $L_{ru}$ and $R_{ru}$, with $L_{ru}$ being to the left of the center DC tone and $R_{ru}$ being to the right of the center DC tone along the axis of subcarrier indices and with an equal distance between the center DC tone and $L_{ru}$ as well as between the center DC tone and $R_{ru}$. Secondly, a pattern of tone distribution in $L_{ru}$ and a pattern of tone distribution in $R_{ru}$ in design 200 may be symmetric with respect to the center DC tone, as can be seen in FIG. 2. There may be one or more guard tones to the left of $L_{ru}$. Similarly, there may be one or more guard tones to the right or $R_{ru}$. Under the proposed scheme, $L_{ru}$ and $R_{ru}$ indices may be generated based on a general rule of dRU design.

Figure 3:
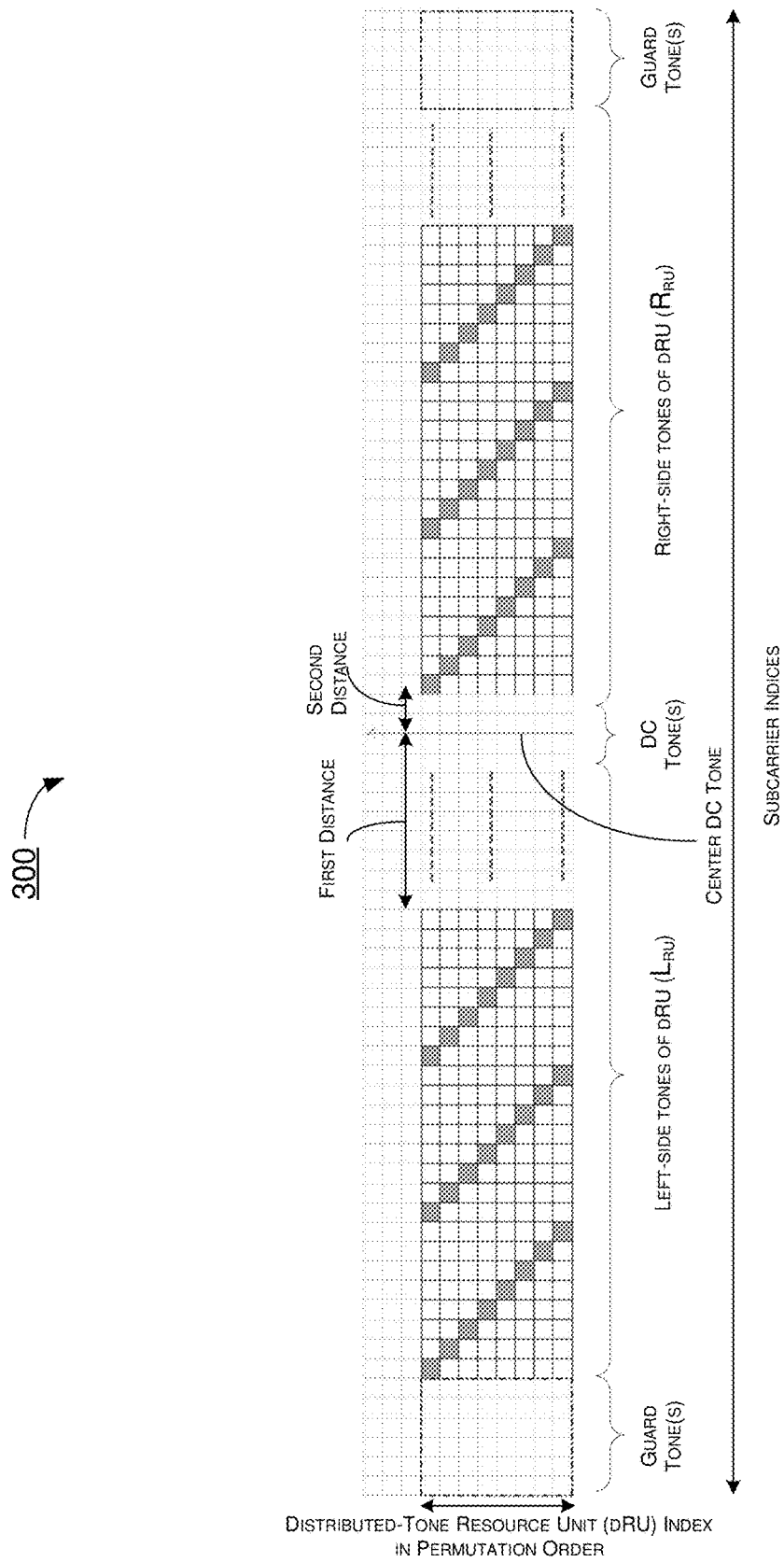
FIG. 3 is a diagram of an example design in accordance with an implementation of the present disclosure.

FIG. 3 illustrates an example design 300 in accordance with an implementation of Option 2 under the proposed scheme. Design 300 pertains to assignment or distribution of subcarrier indices for distributed-tone RUs with the distributed-tone RUs being distributed in a non-symmetric or asymmetric fashion relative to one or more DC tones. As shown in FIG. 3, in Option 2, dRU tone distributions may be asymmetric to a number of DC tones, with a horizontal axis being subcarrier indices and a vertical axis being dRU index in a permutation order. In design 300, each dRU may include a left-side portion ($L_{ru}$) and a right-side portion ($R_{ru}$) relative to a center DC tone among one or more DC tones. The distribution of $L_{ru}$ and $R_{ru}$ may be non-symmetric or asymmetric to the center DC tone in two ways. Firstly, the center DC tone is located asymmetrically in the middle between $L_{ru}$ and $R_{ru}$, with $L_{ru}$ being to the left of the center DC tone and $R_{ru}$ being to the right of the center DC tone along the axis of subcarrier indices and with an first distance between the center DC tone and $L_{ru}$ and a second distance between the center DC tone and $R_{ru}$ different from the first distance. Put differently, design 300 may be seen as design 200 being shifted toward one side (either the left side or the right side) of the center DC tone. In the example shown in FIG. 3, the first distance between the center DC tone and $L_{ru}$ is greater than the second distance between the center DC tone and $R_{ru}$, although in actual implementations the situation may be the opposite. Accordingly, in the example shown in FIG. 3, the distribution of left-side portion and right-side portion may be seen as being equivalent to shifting a symmetric distribution (e.g., that of design 200) to one side (e.g., left side) of the center DC tone. Secondly, a pattern of tone distribution in $L_{ru}$ and a pattern of tone distribution in $R_{ru}$ in design 300 may be non-symmetric or asymmetric with respect to the center DC tone, as can be seen in FIG. 3. There may be one or more guard tones to the left of $L_{ru}$. Similarly, there may be one or more guard tones to the right or $R_{ru}$. Under the proposed scheme, $L_{ru}$ and $R_{ru}$ indices may be generated based on a general rule of iRU design.

Each of FIG. 4, FIG. 5A, FIG. 5B, FIG. 6, FIG. 7, FIG. 8A, FIG. 8B, FIG. 9A, FIG. 9B, FIG. 10 and FIG. 11 shows a respective example design for cases in which assignment or distribution of subcarrier indices for distributed-tone RUs is symmetric to the center DC tone. Each of these figures is further described below.

FIG. 4 illustrates an example design 400 of assignment or distribution of subcarrier indices for dRUs over BW20. It is noteworthy that in the present disclosure, each entry may be generalized as $[-a:D_{td}:-b\ b:D_{td}:a]$, with "−a" denoting a left-most tone of a given dRU in the lower portion, "−b" denoting a right-most tone of the dRU in the lower portion, and "$D_{td}$" denoting a tone distance between two adjacent tones of the dRU. It is also noteworthy that, instead of −122, in design 400 the value of −121 or −120 may be used as the first left-side tone and, in such a case, other tone indices may need to be adjusted accordingly. Additionally, in the field of "dRU index and subcarrier range" for 52-tone dRU and 106-tone dRU, " . . . " denotes the "V+n*Np" progression corresponding to the incrementation of n=3, 4, . . . , 11. Moreover, fliplr($L_{ru}$)=$L_{ru}$ (end:−1:1), and the terms Np, V, S may be specified with other numbers.

Figure 5A:
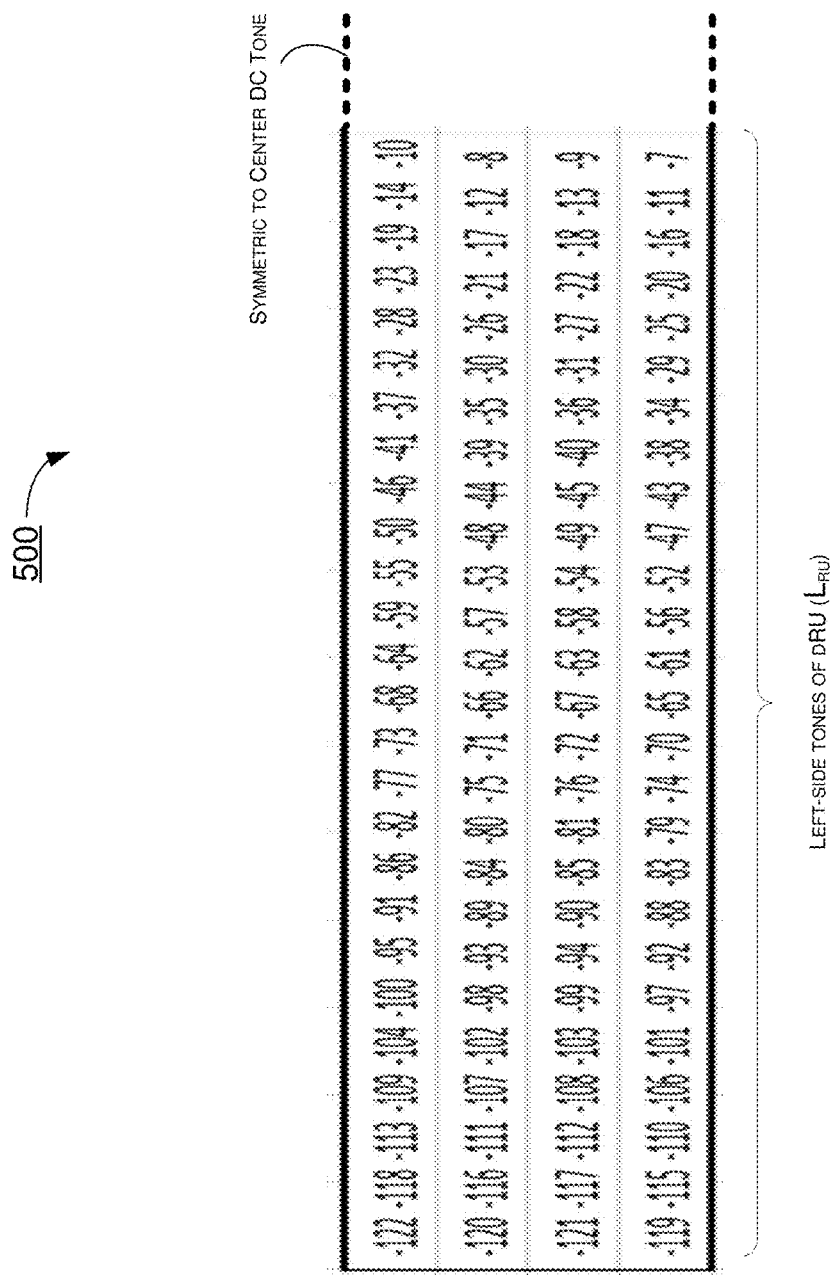
FIG. 5A and FIG. 5B each is a diagram of a respective portion of an example design in accordance with an implementation of the present disclosure.
Figure 5B:
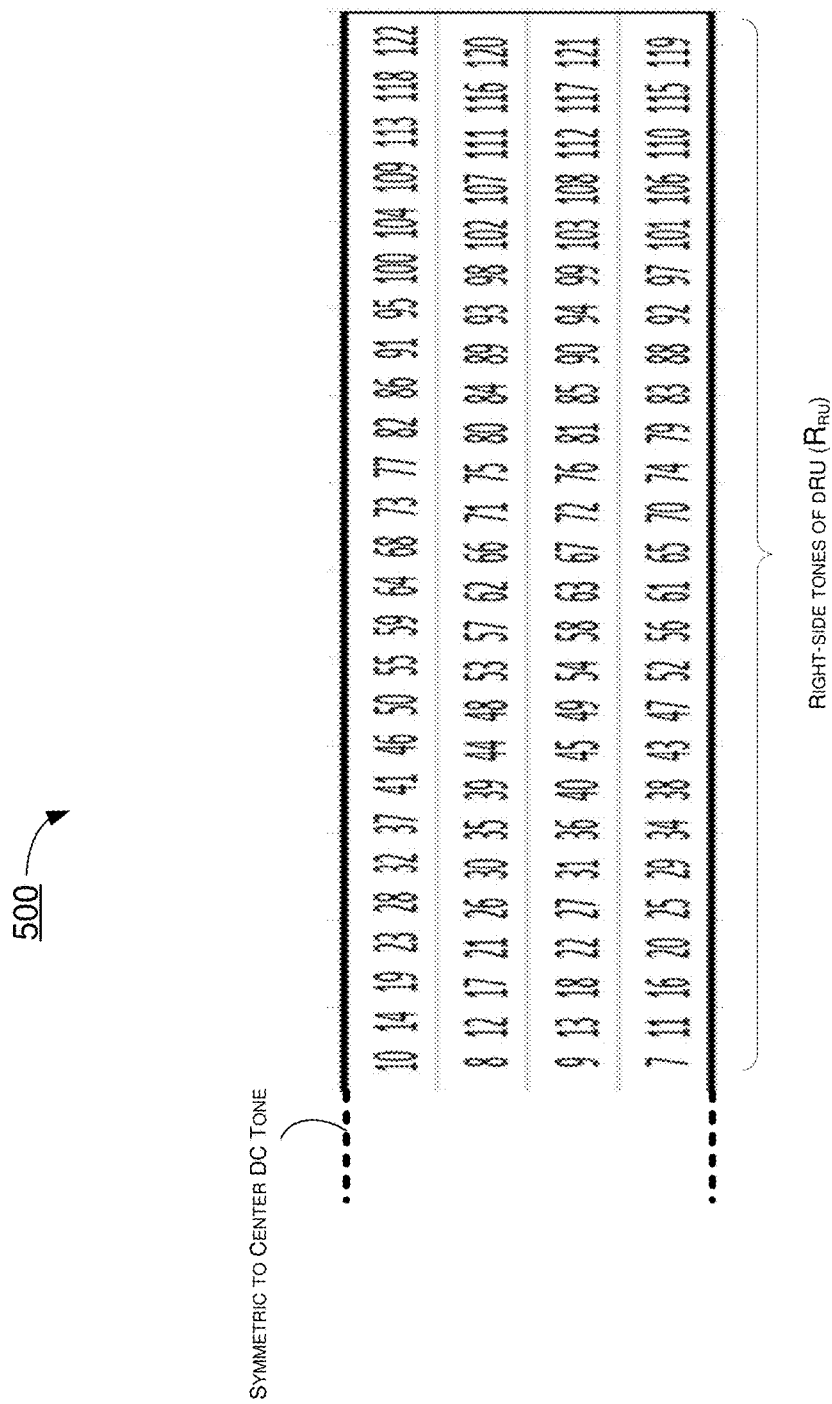

FIG. 5A and FIG. 5B each illustrates a respective portion of an example design 500 of assignment or distribution of subcarrier indices for a 52-tone dRU. Specifically, FIG. 5A shows a left-side (or lower) portion ($L_{ru}$) of the 52-tone dRU, and FIG. 5B shows a right-side (or upper) portion ($R_{ru}$) of the 52-tone dRU. The $L_{ru}$ and $R_{ru}$ of the 52-tone dRU may be symmetric to one or more DC tones including a center DC tone.

FIG. 6 illustrates an example design 600 of assignment or distribution of subcarrier indices for dRUs over BW40. It is noteworthy that, instead of −244, in design 600 the value of −243 may be used as the first left-side tone and, in such a case, other tone indices may need to be adjusted accordingly.

FIG. 7 illustrates an example design 700 of assignment or distribution of subcarrier indices for dRUs over BW80. It is noteworthy that, instead of −500, in design 700 the value of −499 may be used as the first left-side tone and, in such a case, other tone indices may need to be adjusted accordingly. It is also noteworthy that dRU subcarrier indices for BW160 and BW320 may be generated following the same methodology/procedure as for BW20, BW40 and BW80 described and shown herein.

Figure 8A:
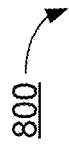

FIG. 8A and FIG. 8B each illustrates a respective portion of an example design 800 of assignment or distribution of pilot indices for a 26-tone dRU. Specifically, FIG. 8A shows assignment or distribution of pilot indices for a 26-tone dRU under Option A, which preserves the relative pilot positions as regular RUs with respect to the first left-hand tone. It is noteworthy that dRU pilot indices for BW160 and BW320 under Option A may be generated following the same methodology/procedure as for BW20, BW40 and BW80 described and shown herein. FIG. 8B shows assignment or distribution of pilot indices for a 26-tone dRU under Option B such that pilot tones are symmetric to one or more DC tones including a center DC tone. It is noteworthy that dRU pilot indices for BW160 and BW320 under Option B may be generated following the same methodology/procedure as for BW20, BW40 and BW80 described and shown herein.

Figure 9A:

FIG. 9A and FIG. 9B each illustrates a respective portion of an example design 900 of assignment or distribution of pilot indices for a 52-tone dRU. Specifically, FIG. 9A shows assignment or distribution of pilot indices for a 52-tone dRU under Option A, which preserves the relative pilot positions as regular RUs with respect to the first left-hand tone. It is noteworthy that dRU pilot indices for BW160 and BW320 under Option A may be generated following the same methodology/procedure as for BW20, BW40 and BW80 described and shown herein. FIG. 9B shows assignment or distribution of pilot indices for a 52-tone dRU under Option B such that pilot tones are symmetric to one or more DC tones including a center DC tone. It is noteworthy that iRU pilot indices for BW160 and BW320 under Option B may be generated following the same methodology/procedure as for BW20, BW40 and BW80 described and shown herein.

FIG. 10 illustrates an example design 1000 of assignment or distribution of pilot indices for a 106-tone dRU. Specifically, part (A) of FIG. 10 shows assignment or distribution of pilot indices for a 106-tone dRU under Option A, which preserves the relative pilot positions as regular RUs with respect to the first left-hand tone. It is noteworthy that iRU pilot indices for BW160 and BW320 under Option A may be generated following the same methodology/procedure as for BW20, BW40 and BW80 described and shown herein. Part (B) of FIG. 10 shows assignment or distribution of pilot indices for a 106-tone iRU under Option B such that pilot tones are symmetric to one or more DC tones including a center DC tone. It is noteworthy that iRU pilot indices for BW160 and BW320 under Option B may be generated following the same methodology/procedure as for BW20, BW40 and BW80 described and shown herein.

FIG. 11 illustrates an example design 1100 of assignment or distribution of pilot indices for a 242-tone dRU. Specifically, part (A) of FIG. 11 shows assignment or distribution of pilot indices for a 242-tone dRU under Option A, which preserves the relative pilot positions as regular RUs with respect to the first left-hand tone. It is noteworthy that dRU pilot indices for BW160 and BW320 under Option A may be generated following the same methodology/procedure as for BW20, BW40 and BW80 described and shown herein. Part (B) of FIG. 11 shows assignment or distribution of pilot indices for a 242-tone dRU under Option B such that pilot tones are symmetric to one or more DC tones including a center DC tone. It is noteworthy that iRU pilot indices for BW160 and BW320 under Option B may be generated following the same methodology/procedure as for BW20, BW40 and BW80 described and shown herein.

Each of FIG. 12, FIG. 13, FIG. 14, FIG. 15, FIG. 16, FIG. 17 and FIG. 18 shows a respective example design for cases in which assignment or distribution of subcarrier indices for interleaved-tone RUs is not symmetric to the center DC tone (e.g., shifted to one side with respect to the center DC tone). Each of these figures is further described below.

FIG. 12 illustrates an example design 1200 of assignment or distribution of subcarrier indices for iRUs over BW20. It is noteworthy that, instead of −122, in design 1200 the value of −121 or −120 may be used as the first left-side tone and, in such a case, other tone indices may need to be adjusted accordingly.

FIG. 13 illustrates an example design 1300 of assignment or distribution of subcarrier indices for dRUs over BW40. It is noteworthy that, instead of −244, in design 1300 the value of −243 may be used as the first left-side tone and, in such a case, other tone indices may need to be adjusted accordingly.

FIG. 14 illustrates an example design 1400 of assignment or distribution of subcarrier indices for dRUs over BW80. It is noteworthy that, instead of −500, in design 1400 the value of −499 may be used as the first left-side tone and, in such a case, other tone indices may need to be adjusted accordingly. It is also noteworthy that dRU subcarrier indices for BW160 and BW320 may be generated following the same methodology/procedure as for BW20, BW40 and BW80 described and shown herein.

Figure 15:
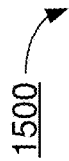
FIG. 15 is a diagram of an example design in accordance with an implementation of the present disclosure.

FIG. 15 illustrates an example design 1500 of assignment or distribution of pilot indices for a 26-tone dRU. It is noteworthy that dRU pilot indices for BW160 and BW320 may be generated following the same methodology/procedure as for BW20, BW40 and BW80 described and shown herein.

FIG. 16 illustrates an example design 1600 of assignment or distribution of pilot indices for a 52-tone dRU. It is noteworthy that dRU pilot indices for BW160 and BW320 may be generated following the same methodology/procedure as for BW20, BW40 and BW80 described and shown herein.

FIG. 17 illustrates an example design 1700 of assignment or distribution of pilot indices for a 106-tone dRU. It is noteworthy that dRU pilot indices for BW160 and BW320 may be generated following the same methodology/procedure as for BW20, BW40 and BW80 described and shown herein.

FIG. 18 illustrates an example design 1800 of assignment or distribution of pilot indices for a 242-tone dRU. It is noteworthy that dRU pilot indices for BW160 and BW320 may be generated following the same methodology/procedure as for BW20, BW40 and BW80 described and shown herein.

Under a proposed scheme in accordance with the present disclosure, dRU subcarrier indices may be generated with one or more traits or characteristics. For instance, dRU subcarrier indices may be generated to be edge-tone aligned (e.g., being aligned with the first left-hand tone) and DC tone-symmetric (e.g., symmetric with respect to a center DC tone of one or more DC tones as shown in design 200). Alternatively, dRU subcarrier indices may be generated to be center aligned and also DC tone-symmetric. Alternatively, dRU subcarrier indices may be generated to be edge-tone aligned but DC tone-asymmetric (e.g., asymmetric or not symmetric with respect to a center DC tone of one or more DC tones as shown in design 300). Alternatively, dRU subcarrier indices may be generated to be center aligned but DC tone-asymmetric.

Under another proposed scheme in accordance with the present disclosure, dRU subcarrier indices may be defined in one of multiple approaches. In a first approach, dRU subcarrier indices may be defined in a pure formula based fashion. In a second approach, dRU subcarrier indices may be defined with all the indices listed in one or more tables. In a third approach, dRU subcarrier indices may be defined by listing only the indices for a 26-tone dRU (or the indices for both the 26-tone dRU and a 52-tone dRU) in a table such that indices for larger-sized dRUs (e.g., 52-tone dRU, 106-tone dRU, 242-tone dRU and 484-tone dRU) may be represented or otherwise built from the 26-tone dRU based on dRU hierarchical structure, plus any extra tones for padding if necessary. For instance, indices for the 52-tone dRU may be generated or defined based on two 26-tone dRUs. Similarly, indices for the 106-tone dRU may be generated or defined based on four 26-tone dRUs or two 52-tone dRUs plus padding with two extra tones. Likewise, indices for the 242-tone dRU may be generated or defined based on two 106-tone dRUs and one 26-tone dRU plus padding with four extra tones. Moreover, indices for the 484-tone dRU may be generated or defined based on two 242-tone dRUs, and so on.

Each of FIG. 19, FIG. 20, FIG. 21, FIG. 22, FIG. 23, FIG. 24, FIG. 25, FIG. 26, FIG. 27A, FIG. 27B, FIG. 27C, FIG. 27D, FIG. 28A, FIG. 28B, FIG. 28C, FIG. 28D, FIG. 29A, FIG. 29B, FIG. 29C, FIG. 29D, FIG. 30A, FIG. 30B, FIG. 30C and FIG. 30D shows a respective example design under the proposed schemes. Each of these figures is further described below.

FIG. 19 illustrates an example design 1900 of generation of subcarrier indices for dRUs over BW20. Specifically, design 1900 shows an example of generating dRUs of 26 tones, 52 tones and 106 tones that are edge-tone aligned and DC tone-symmetric. It is noteworthy that, in design 1900, the dRU1 of the 106-tone iRU may alternatively be defined with 52-tone [dRU1, dRU2] plus two extra tones and that the dRU2 of the 106-tone dRU may alternatively be defined with 52-tone [dRU3, dRU4] plus two extra tones.

FIG. 20 illustrates an example design 2000 of generation of subcarrier indices for dRUs over BW20. Specifically, design 2000 shows an example of generating dRUs of 26 tones, 52 tones and 106 tones that are center aligned and DC tone-symmetric. It is noteworthy that, in design 2000, the dRU1 of the 106-tone dRU may alternatively be defined with 52-tone [dRU1, dRU2] plus padding with two extra tones and that the dRU2 of the 106-tone dRU may alternatively be defined with 52-tone [dRU3, dRU4] plus padding with two extra tones.

FIG. 21 illustrates an example design 2100 of generation of subcarrier indices for dRUs over BW20. Specifically, design 2100 shows an example of generating dRUs of 26 tones, 52 tones and 106 tones that are edge-tone aligned and DC tone-asymmetric. It is noteworthy that, in design 2100, the dRU1 of the 106-tone dRU may alternatively be defined with 52-tone [dRU1, dRU2] plus padding two extra tones and that the dRU2 of the 106-tone dRU may alternatively be defined with 52-tone [dRU3, dRU4] plus padding with two extra tones.

FIG. 22 illustrates an example design 2200 of generation of subcarrier indices for dRUs over BW20. Specifically, design 2200 shows an example of generating dRUs of 26 tones, 52 tones and 106 tones that are center aligned and DC tone-asymmetric. It is noteworthy that, in design 2200, the dRU1 of the 106-tone dRU may alternatively be defined with 52-tone [dRU1, dRU2] plus padding with two extra tones and that the dRU2 of the 106-tone dRU may alternatively be defined with 52-tone [dRU3, dRU4] plus padding with two extra tones.

FIG. 23 illustrates an example design 2300 of generation of subcarrier indices for dRUs over BW40. Specifically, design 2300 shows an example of generating dRUs of 26 tones, 52 tones, 106 tones and 242 tones that are edge-tone aligned and DC tone-symmetric.

FIG. 24 illustrates an example design 2400 of generation of subcarrier indices for dRUs over BW40. Specifically, design 2400 shows an example of generating dRUs of 26 tones, 52 tones, 106 tones and 242 tones that are center aligned and DC tone-symmetric.

FIG. 25 illustrates an example design 2500 of generation of subcarrier indices for dRUs over BW40. Specifically, design 2500 shows an example of generating dRUs of 26 tones, 52 tones, 106 tones and 242 tones that are edge-tone aligned and DC tone-asymmetric.

FIG. 26 illustrates an example design 2600 of generation of subcarrier indices for dRUs over BW40. Specifically, design 2600 shows an example of generating dRUs of 26 tones, 52 tones, 106 tones and 242 tones that are center aligned and DC tone-asymmetric.

FIG. 27A, FIG. 27B, FIG. 27C and FIG. 27D each illustrates a respective portion of an example design 2700 of generation of subcarrier indices for dRUs over BW80. Specifically, FIG. 27A shows an example of generating some dRUs of 26 tones that are edge-tone aligned and DC tone-symmetric, FIG. 27B shows an example of generating some other dRUs of 26 tones that are edge-tone aligned and DC tone-symmetric, FIG. 27C shows an example of generating some dRUs of 52 tones, 106 tones, 242 tones and 484 tones that are edge-tone aligned and DC tone-symmetric, and FIG. 27D shows an example of generating some other dRUs of 52 tones, 106 tones, 242 tones and 484 tones that are edge-tone aligned and DC tone-symmetric.

FIG. 28A, FIG. 28B, FIG. 28C and FIG. 28D each illustrates a respective portion of an example design 2800 of generation of subcarrier indices for dRUs over BW80. Specifically, FIG. 28A shows an example of generating some dRUs of 26 tones that are center aligned and DC tone-symmetric, FIG. 28B shows an example of generating some other iRUs of 26 tones that are center aligned and DC tone-symmetric, FIG. 28C shows an example of generating some dRUs of 52 tones, 106 tones, 242 tones and 484 tones that are center aligned and DC tone-symmetric, and FIG. 28D shows an example of generating some other dRUs of 52 tones, 106 tones, 242 tones and 484 tones that are center aligned and DC tone-symmetric.

Figure 29A:
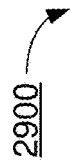

FIG. 29A, FIG. 29B, FIG. 29C and FIG. 29D each illustrates a respective portion of an example design 2900 of generation of subcarrier indices for dRUs over BW80. Specifically, FIG. 29A shows an example of generating some dRUs of 26 tones that are edge-tone aligned and DC tone-asymmetric, FIG. 29B shows an example of generating some other dRUs of 26 tones that are edge-tone aligned and DC tone-asymmetric, FIG. 29C shows an example of generating some dRUs of 52 tones, 106 tones, 242 tones and 484 tones that are edge-tone aligned and DC tone-asymmetric, and FIG. 29D shows an example of generating some other dRUs of 52 tones, 106 tones, 242 tones and 484 tones that are edge-tone aligned and DC tone-asymmetric.

FIG. 30A, FIG. 30B, FIG. 30C and FIG. 30D each illustrates a respective portion of an example design 3000 of generation of subcarrier indices for dRUs over BW80. Specifically, FIG. 30A shows an example of generating some dRUs of 26 tones that are center aligned and DC tone-asymmetric, FIG. 30B shows an example of generating some other dRUs of 26 tones that are center aligned and DC tone-asymmetric, FIG. 30C shows an example of generating some dRUs of 52 tones, 106 tones, 242 tones and 484 tones that are center aligned and DC tone-asymmetric, and FIG. 30D shows an example of generating some other dRUs of 52 tones, 106 tones, 242 tones and 484 tones that are center aligned and DC tone-asymmetric.

Illustrative Implementations

Figure 31:
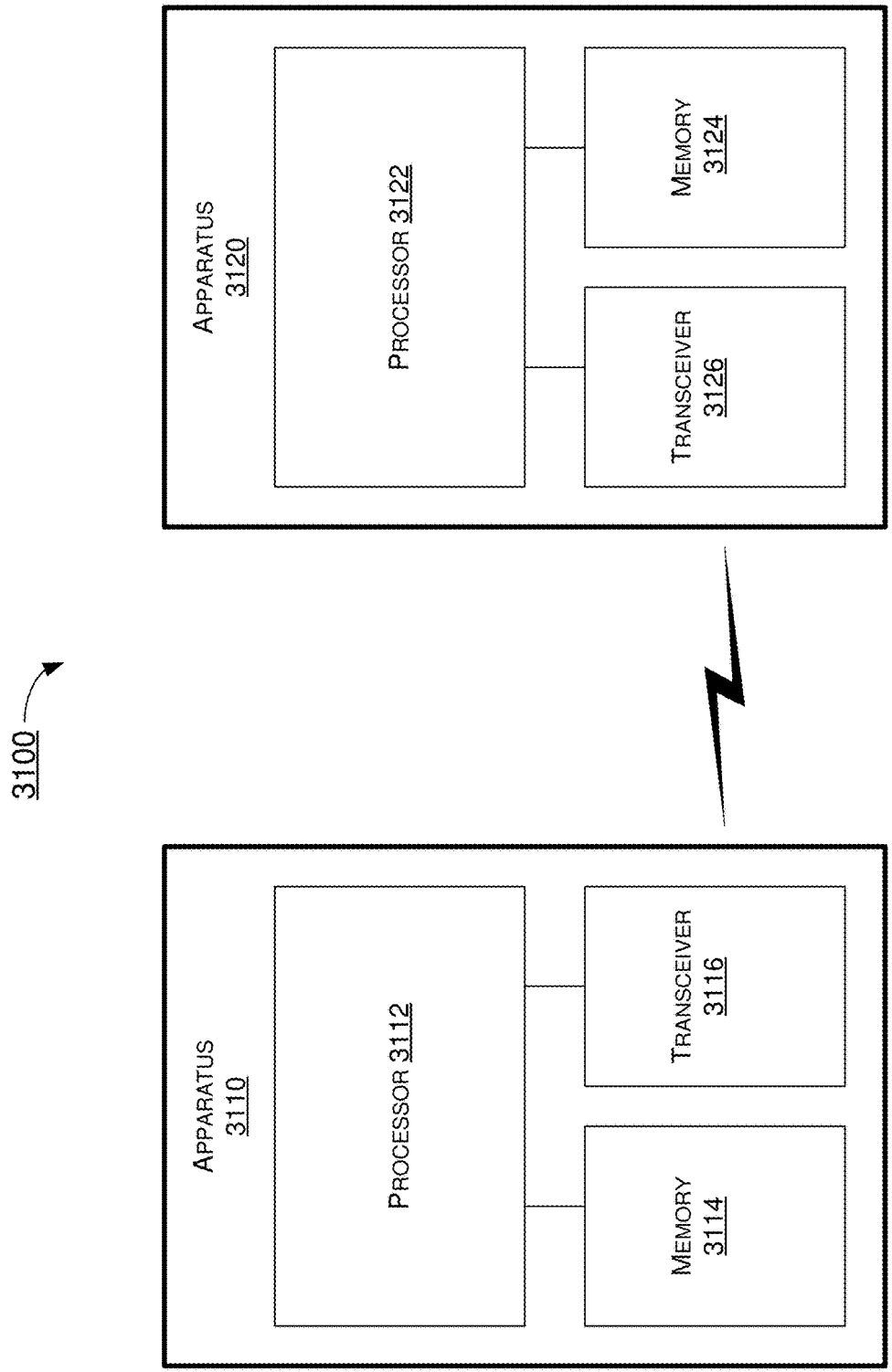
FIG. 31 is a block diagram of an example communication system in accordance with an implementation of the present disclosure.

FIG. 31 illustrates an example system 3100 having at least an example apparatus 3110 and an example apparatus 3120 in accordance with an implementation of the present disclosure. Each of apparatus 3110 and apparatus 3120 may perform various functions to implement schemes, techniques, processes and methods described herein pertaining to subcarrier indices for distributed-tone RUs (dRU) in 6 GHz LPI systems, including the various schemes described above with respect to various proposed designs, concepts, schemes, systems and methods described above as well as processes described below. For instance, apparatus 3110 may be an example implementation of communication entity 110, and apparatus 3120 may be an example implementation of communication entity 120.

Each of apparatus 3110 and apparatus 3120 may be a part of an electronic apparatus, which may be a STA or an AP, such as a portable or mobile apparatus, a wearable apparatus, a wireless communication apparatus or a computing apparatus. For instance, each of apparatus 3110 and apparatus 3120 may be implemented in a smartphone, a smart watch, a personal digital assistant, a digital camera, or a computing equipment such as a tablet computer, a laptop computer or a notebook computer. Each of apparatus 3110 and apparatus 3120 may also be a part of a machine type apparatus, which may be an IoT apparatus such as an immobile or a stationary apparatus, a home apparatus, a wire communication apparatus or a computing apparatus. For instance, each of apparatus 3110 and apparatus 3120 may be implemented in a smart thermostat, a smart fridge, a smart door lock, a wireless speaker or a home control center. When implemented in or as a network apparatus, apparatus 3110 and/or apparatus 3120 may be implemented in a network node, such as an AP in a WLAN.

In some implementations, each of apparatus 3110 and apparatus 3120 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 3110 and apparatus 3120 may be implemented in or as a STA or an AP. Each of apparatus 3110 and apparatus 3120 may include at least some of those components shown in FIG. 31 such as a processor 3112 and a processor 3122, respectively, for example. Each of apparatus 3110 and apparatus 3120 may further include one or more other components not pertinent to the proposed scheme of the present disclosure (e.g., internal power supply, display device and/or user interface device), and, thus, such component(s) of apparatus 3110 and apparatus 3120 are neither shown in FIG. 31 nor described below in the interest of simplicity and brevity.

In one aspect, each of processor 3112 and processor 3122 may be implemented in the form of one or more single-core processors, one or more multi-core processors, one or more RISC processors or one or more CISC processors. That is, even though a singular term "a processor" is used herein to refer to processor 3112 and processor 3122, each of processor 3112 and processor 3122 may include multiple processors in some implementations and a single processor in other implementations in accordance with the present disclosure. In another aspect, each of processor 3112 and processor 3122 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 3112 and processor 3122 is a special-purpose machine specifically designed, arranged and configured to perform specific tasks including those pertaining to subcarrier indices for distributed-tone RUs in 6 GHz LPI systems in accordance with various implementations of the present disclosure. For instance, each of processor 3112 and processor 3122 may be configured with hardware components, or circuitry, implementing one, some or all of the examples described and illustrated herein.

In some implementations, apparatus 3110 may also include a transceiver 3116 coupled to processor 3112. Transceiver 3116 may be capable of wirelessly transmitting and receiving data. In some implementations, apparatus 3120 may also include a transceiver 3126 coupled to processor 3122. Transceiver 3126 may include a transceiver capable of wirelessly transmitting and receiving data.

In some implementations, apparatus 3110 may further include a memory 3114 coupled to processor 3112 and capable of being accessed by processor 3112 and storing data therein. In some implementations, apparatus 3120 may further include a memory 3124 coupled to processor 3122 and capable of being accessed by processor 3122 and storing data therein. Each of memory 3114 and memory 3124 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 3114 and memory 3124 may include a type of read-only memory (ROM) such as mask ROM, programmable ROM (PROM), erasable programmable ROM (EPROM) and/or electrically erasable programmable ROM (EEPROM). Alternatively, or additionally, each of memory 3114 and memory 3124 may include a type of non-volatile random-access memory (NVRAM) such as flash memory, solid-state memory, ferroelectric RAM (FeRAM), magnetoresistive RAM (MRAM) and/or phase-change memory.

Each of apparatus 3110 and apparatus 3120 may be a communication entity capable of communicating with each other using various proposed schemes in accordance with the present disclosure. For illustrative purposes and without limitation, a description of capabilities of apparatus 3110, as communication entity 110, and apparatus 3120, as communication entity 120, is provided below. It is noteworthy that, although the example implementations described below are provided in the context of WLAN, the same may be implemented in other types of networks. Thus, although the following description of example implementations pertains to a scenario in which apparatus 3110 functions as a transmitting device and apparatus 3120 functions as a receiving device, the same is also applicable to another scenario in which apparatus 3110 functions as a receiving device and apparatus 3120 functions as a transmitting device.

Under a proposed scheme in accordance with the present disclosure with respect to subcarrier indices for distributed-tone RUs (dRU) in 6 GHz LPI systems, processor 3112 of apparatus 3110 may distribute frequency tones of a RU over a distribution bandwidth as a distributed-tone RU. Additionally, processor 3112 may generate a plurality of subcarrier indices for the distributed-tone RU such that a distribution of the distributed-tone RU is symmetric to a DC tone along an axis of subcarrier indices. Alternatively, processor 3112 may generate the plurality of subcarrier indices for the distributed-tone RU such that a distribution of the distributed-tone RU is non-symmetric or asymmetric to the DC tone along an axis of subcarrier indices. Furthermore, processor 3112 may communicate wirelessly, via transceiver 3116, with apparatus 3120 using the distributed-tone RU in a 6 GHz LPI system.

In some implementations, the distributed-tone RU may include a left-side (or lower) portion and a right-side (or upper) portion relative to the DC tone along the axis of subcarrier indices. In case of symmetric distribution with respect to the DC tone, the left-side (or lower) portion may be on a left side of the DC tone and the right-side (or upper) portion may be on a right side of the DC tone with an equal distance between the DC tone and the left-side portion as well as between the DC tone and the right-side portion. In case of asymmetric distribution with respect to the DC tone, the left-side portion may be on a left side of the DC tone and the right-side portion may be on a right side of the DC tone with a first distance between the DC tone and the left-side portion and a second distance between the DC tone and the right-side portion different from the first distance.

In some implementations, in generating the plurality of subcarrier indices, processor 3112 may generate edge-tone aligned and DC-symmetric subcarrier indices.

In some implementations, in generating the plurality of subcarrier indices, processor 3112 may generate center aligned and DC-symmetric subcarrier indices.

In some implementations, in generating the plurality of subcarrier indices, processor 3112 may generate edge-tone aligned and DC-asymmetric subcarrier indices.

In some implementations, in generating the plurality of subcarrier indices, processor 3112 may generate center aligned and DC-asymmetric subcarrier indices.

In some implementations, the distributed-tone RU (dRU) may be distributed over a 20 MHz bandwidth, and wherein the distributed-tone RU (dRU) comprises a 26-tone dRU, a 52-tone dRU or a 106-tone dRU.

In some implementations, the distributed-tone RU (dRU) may be distributed over a 40 MHz bandwidth, and wherein the distributed-tone RU (dRU) comprises a 26-tone dRU, a 52-tone dRU, a 106-tone dRU or a 242-tone dRU.

In some implementations, the distributed-tone RU (dRU) may be distributed over a 80 MHz bandwidth, and wherein the distributed-tone RU (dRU) comprises a 26-tone dRU, a 52-tone dRU, a 106-tone dRU, a 242-tone dRU or a 484-tone dRU.

In some implementations, the distributed-tone RU may include an aggregate of multiple dRUs (dMRU). For instance, the dMRU may include an aggregate of a 26-tone dRU and a 52-tone dRU (or otherwise denoted as dMRU (26+52)) or an aggregate of the 26-tone dRU and a 106-tone dRU (or otherwise denoted as dMRU(26+106)).

In some implementations, in generating the plurality of subcarrier indices, processor 3112 may list or otherwise provide a set of subcarrier indices for a 26-tone dRU in a table such that, for a larger-sized dRU with more than 26 tones, in generating the plurality of subcarrier indices, processor 3112 may generate another set of subcarrier indices for the larger-sized dRU from the table and using a dRU hierarchical structure with or without one or more extra tones as padding. In some implementations, subcarrier indices for a 52-tone dRU may be generated from corresponding two 26-tone dRUs, subcarrier indices for a 106-tone dRU may be generated from either corresponding four 26-tone dRUs or corresponding two 52-tone dRUs with two extra tones as padding, subcarrier indices for a 242-tone dRU may be generated from corresponding two 106-tone dRUs and one 26-tone dRU with four extra tones as padding, and subcarrier indices for a 484-tone dRU may be generated from corresponding two 242-tone dRUs.

Illustrative Processes

FIG. 32 illustrates an example process 3200 in accordance with an implementation of the present disclosure. Process 3200 may represent an aspect of implementing various proposed designs, concepts, schemes, systems and methods described above. More specifically, process 3200 may represent an aspect of the proposed concepts and schemes pertaining to subcarrier indices for distributed-tone RUs in 6 GHz LPI systems in accordance with the present disclosure. Process 3200 may include one or more operations, actions, or functions as illustrated by one or more of blocks 3210, 3220 and 3230. Although illustrated as discrete blocks, various blocks of process 3200 may be divided into additional blocks, combined into fewer blocks, or eliminated, depending on the desired implementation. Moreover, the blocks/sub-blocks of process 3200 may be executed in the order shown in FIG. 32 or, alternatively in a different order. Furthermore, one or more of the blocks/sub-blocks of process 3200 may be executed repeatedly or iteratively. Process 3200 may be implemented by or in apparatus 3110 and apparatus 3120 as well as any variations thereof. Solely for illustrative purposes and without limiting the scope, process 3200 is described below in the context of apparatus 3110 as communication entity 110 (e.g., a transmitting device whether a STA or an AP) and apparatus 3120 as communication entity 120 (e.g., a receiving device whether a STA or an AP) of a wireless network such as a WLAN in accordance with one or more of IEEE 802.11 standards. Process 3200 may begin at block 3210.

At 3210, process 3200 may involve processor 3112 of apparatus 3110 distributing frequency tones of a RU over a distribution bandwidth as a distributed-tone RU. Process 3200 may proceed from 3210 to 3220.

At 3220, process 3200 may involve processor 3112 generating a plurality of subcarrier indices for the distributed-tone RU such that a distribution of the distributed-tone RU is symmetric to a DC tone along an axis of subcarrier indices. Process 3200 may proceed from 3220 to 3230.

At 3230, process 3200 may involve processor 3112 communicating wirelessly, via transceiver 3116, with apparatus 3120 using the distributed-tone RU in a 6 GHz LPI system.

In some implementations, the distributed-tone RU may include a left-side (or lower) portion and a right-side (or upper) portion relative to the DC tone along the axis of subcarrier indices. Moreover, the left-side portion may be on a left side of the DC tone and the right-side portion may be on a right side of the DC tone with an equal distance between the DC tone and the left-side portion as well as between the DC tone and the right-side portion.

In some implementations, in generating the plurality of subcarrier indices, process 3200 may involve processor 3112 generating edge-tone aligned and DC-symmetric subcarrier indices.

In some implementations, in generating the plurality of subcarrier indices, process 3200 may involve processor 3112 generating center aligned and DC-symmetric subcarrier indices.

In some implementations, in generating the plurality of subcarrier indices, process 3200 may involve processor 3112 generating edge-tone aligned and DC-asymmetric subcarrier indices.

In some implementations, in generating the plurality of subcarrier indices, process 3200 may involve processor 3112 generating center aligned and DC-asymmetric subcarrier indices.

In some implementations, the distributed-tone (or interleaved-tone) RU may be distributed over a 20 MHz bandwidth, and wherein the distributed-tone RU on BW20 comprises a 26-tone dRU, a 52-tone dRU or a 106-tone dRU.

In some implementations, the distributed-tone (or interleaved-tone) RU may be distributed over a 40 MHz bandwidth, and wherein the distributed-tone RU on BW40 comprises a 26-tone dRU, a 52-tone dRU, a 106-tone dRU or a 242-tone dRU.

In some implementations, the distributed-tone (or interleaved-tone) RU may be distributed over a 80 MHz bandwidth, and wherein the distributed-tone RU on BW80 comprises a 26-tone dRU, a 52-tone dRU, a 106-tone dRU, a 242-tone dRU or a 484-tone dRU.

In some implementations, the distributed-tone RU may include an aggregate of multiple dRUs (dMRU). For instance, the dMRU may include an aggregate of a 26-tone dRU and a 52-tone dRU (or otherwise denoted as dMRU (26+52)) or an aggregate of the 26-tone dRU and a 106-tone dRU (or otherwise denoted as dMRU(26+106)).

In some implementations, in generating the plurality of subcarrier indices, process 3200 may involve processor 3112 listing or otherwise providing a set of subcarrier indices for a 26-tone dRU in a table such that, for a larger-sized dRU with more than 26 tones, in generating the plurality of subcarrier indices, process 3200 may further involve processor 3112 generating another set of subcarrier indices for the larger-sized dRU from the table and using a dRU hierarchical structure with or without one or more extra tones as padding. In some implementations, subcarrier indices for a 52-tone dRU may be generated from corresponding two 26-tone dRUs, subcarrier indices for a 106-tone dRU may be generated from either corresponding four 26-tone dRUs or corresponding two 52-tone dRUs with two extra tones as padding, subcarrier indices for a 242-tone dRU may be generated from corresponding two 106-tone dRUs and one 26-tone dRU with four extra tones as padding, and subcarrier indices for a 484-tone dRU may be generated from corresponding two 242-tone dRUs.

FIG. 33 illustrates an example process 3300 in accordance with an implementation of the present disclosure. Process 3300 may represent an aspect of implementing various proposed designs, concepts, schemes, systems and methods described above. More specifically, process 3300 may represent an aspect of the proposed concepts and schemes pertaining to subcarrier indices for distributed-tone RUs (dRU) in 6 GHz LPI systems in accordance with the present disclosure. Process 3300 may include one or more operations, actions, or functions as illustrated by one or more of blocks 3310, 3320 and 3330. Although illustrated as discrete blocks, various blocks of process 3300 may be divided into additional blocks, combined into fewer blocks, or eliminated, depending on the desired implementation. Moreover, the blocks/sub-blocks of process 3300 may be executed in the order shown in FIG. 33 or, alternatively in a different order. Furthermore, one or more of the blocks/sub-blocks of process 3300 may be executed repeatedly or iteratively. Process 3300 may be implemented by or in apparatus 3110 and apparatus 3120 as well as any variations thereof. Solely for illustrative purposes and without limiting the scope, process 3300 is described below in the context of apparatus 3110 as communication entity 110 (e.g., a transmitting device whether a STA or an AP) and apparatus 3120 as communication entity 120 (e.g., a receiving device whether a STA or an AP) of a wireless network such as a WLAN in accordance with one or more of IEEE 802.11 standards. Process 3300 may begin at block 3310.

At 3310, process 3200 may involve processor 3112 of apparatus 3110 distributing frequency tones of a RU over a distribution bandwidth as a distributed-tone RU. Process 3300 may proceed from 3310 to 3320.

At 3320, process 3200 may involve processor 3112 generating a plurality of subcarrier indices for the distributed-tone (or interleaved-tone) RU such that a distribution of the distributed-tone RU is non-symmetric or asymmetric to a DC tone along an axis of subcarrier indices. Process 3300 may proceed from 3320 to 3330.

At 3330, process 3200 may involve processor 3112 communicating wirelessly, via transceiver 3116, with apparatus 3120 using the distributed-tone RU in a 6 GHz LPI system.

In some implementations, the distributed-tone (or interleaved-tone) RU may include a left-side (or lower) portion and a right-side (or upper) portion relative to the DC tone along the axis of subcarrier indices. Moreover, the left-side portion may be on a left side of the DC tone and the right-side portion may be on a right side of the DC tone with a first distance between the DC tone and the left-side portion and a second distance between the DC tone and the right-side portion different from the first distance.

In some implementations, in generating the plurality of subcarrier indices, process 3300 may involve processor 3112 generating edge-tone aligned and DC-symmetric subcarrier indices.

In some implementations, in generating the plurality of subcarrier indices, process 3300 may involve processor 3112 generating center aligned and DC-symmetric subcarrier indices.

In some implementations, in generating the plurality of subcarrier indices, process 3300 may involve processor 3112 generating edge-tone aligned and DC-asymmetric subcarrier indices.

In some implementations, in generating the plurality of subcarrier indices, process 3300 may involve processor 3112 generating center aligned and DC-asymmetric subcarrier indices.

In some implementations, the distributed-tone (or interleaved-tone) RU may be distributed over a 20 MHz bandwidth, and wherein the distributed-tone RU comprises a 26-tone dRU, a 52-tone dRU or a 106-tone dRU.

In some implementations, the distributed-tone (or interleaved-tone) RU may be distributed over a 40 MHz bandwidth, and wherein the distributed-tone RU comprises a 26-tone dRU, a 52-tone dRU, a 106-tone dRU or a 242-tone dRU.

In some implementations, the distributed-tone (or interleaved-tone) RU may be distributed over a 80 MHz bandwidth, and wherein the distributed-tone RU comprises a 26-tone dRU, a 52-tone dRU, a 106-tone dRU, a 242-tone dRU or a 484-tone dRU.

In some implementations, the distributed-tone (or interleaved-tone) RU may include an aggregate of multiple dRUs (dMRU). For instance, the dMRU may include an aggregate of a 26-tone dRU and a 52-tone dRU (or otherwise denoted as dMRU(26+52)) or an aggregate of the 26-tone dRU and a 106-tone dRU (or otherwise denoted as dMRU(26+106)).

In some implementations, in generating the plurality of subcarrier indices, process 3300 may involve processor 3112 listing or otherwise providing a set of subcarrier indices for a 26-tone dRU in a table such that, for a larger-sized dRU with more than 26 tones, in generating the plurality of subcarrier indices, process 3300 may further involve processor 3112 generating another set of subcarrier indices for the larger-sized dRU from the table and using a dRU hierarchical structure with or without one or more extra tones as padding. In some implementations, subcarrier indices for a 52-tone dRU may be generated from corresponding two 26-tone dRUs, subcarrier indices for a 106-tone dRU may be generated from either corresponding four 26-tone dRUs or corresponding two 52-tone dRUs with two extra tones as padding, subcarrier indices for a 242-tone dRU may be generated from corresponding two 106-tone dRUs and one 26-tone dRU with four extra tones as padding, and subcarrier indices for a 484-tone dRU may be generated from corresponding two 242-tone dRUs.

ADDITIONAL NOTES

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:
1. A method, comprising:
  distributing frequency tones of a resource unit (RU) over a distribution bandwidth as a distributed-tone RU (DRU);
  generating a plurality of subcarrier indices for the distributed-tone RU such that a distribution of the distributed-tone RU is symmetric to a direct-current (DC) tone along an axis of subcarrier indices; and
  communicating wirelessly using the distributed-tone RU in a 6 GHz low-power indoor (LPI) system, wherein the distributed-tone RU comprises a left-side portion and a right-side portion with respect to the DC tone, which is a center DC tone of a plurality of DC tones, and wherein the distributed-tone RU is symmetric to the center DC tone in which:
- the center DC tone is located symmetrically between the left-side portion and the right-side portion,
- a first pattern of tone distribution in the left-side portion and a second pattern of tone distribution in the right-side portion are symmetric with respect to the center DC tone, and
- the first pattern and the second pattern are opposite of each other in a two-dimensional (2D) space with one axis of DRU index in permutation order and another axis of subcarrier indices.

2. The method of claim 1, wherein the distributed-tone RU comprises a left-side or lower portion and a right-side or upper portion relative to the DC tone along the axis of subcarrier indices, and wherein the left-side portion is on a left side of the DC tone and the right-side portion is on a right side of the DC tone with an equal distance between the DC tone and the left-side portion as well as between the DC tone and the right-side portion.

3. The method of claim 1, wherein the generating of the plurality of subcarrier indices comprises generating edge-tone aligned and DC-symmetric subcarrier indices.

4. The method of claim 1, wherein the generating of the plurality of subcarrier indices comprises generating center aligned and DC-symmetric subcarrier indices.

5. The method of claim 1, wherein the generating of the plurality of subcarrier indices comprises generating edge-tone aligned and DC-asymmetric subcarrier indices.

6. The method of claim 1, wherein the generating of the plurality of subcarrier indices comprises generating center aligned and DC-asymmetric subcarrier indices.

7. The method of claim 1, wherein the distributed-tone RU is distributed over a 20 MHz bandwidth, and wherein the distributed-tone RU comprises a 26-tone DRU, a 52-tone DRU or a 106-tone DRU.

8. The method of claim 1, wherein the distributed-tone RU is distributed over a 40 MHz bandwidth, and wherein the distributed-tone RU comprises a 26-tone DRU, a 52-tone DRU, a 106-tone DRU or a 242-tone DRU.

9. The method of claim 1, wherein the distributed-tone RU is distributed over a 80 MHz bandwidth, and wherein the distributed-tone RU comprises a 26-tone DRU, a 52-tone DRU, a 106-tone DRU, a 242-tone DRU or a 484-tone DRU.

10. The method of claim 1, wherein the generating of the plurality of subcarrier indices comprises providing a set of subcarrier indices for a 26-tone DRU in a table such that, for a larger-sized DRU with more than 26 tones, the generating of the plurality of subcarrier indices further comprises generating another set of subcarrier indices for the larger-sized DRU from the table and using a DRU hierarchical structure with or without one or more extra tones as padding, and wherein:
- subcarrier indices for a 52-tone DRU are generated from corresponding two 26-tone DRUs,
- subcarrier indices for a 106-tone DRU are generated from either corresponding four 26-tone DRUs or corresponding two 52-tone DRUs with two extra tones as padding,
- subcarrier indices for a 242-tone DRU are generated from corresponding two 106-tone DRUs and one 26-tone DRU with four extra tones as padding, and
- subcarrier indices for a 484-tone DRU are generated from corresponding two 242-tone DRUs.

11. A method, comprising:
- distributing frequency tones of a resource unit (RU) over a distribution bandwidth as a distributed-tone RU (DRU);
- generating a plurality of subcarrier indices for the distributed-tone RU such that a distribution of the distributed-tone RU is asymmetric to a direct-current (DC) tone along an axis of subcarrier indices; and
- communicating wirelessly using the distributed-tone RU in a 6 GHz low-power indoor (LPI) system, wherein the distributed-tone RU comprises a left-side portion and a right-side portion with respect to the DC tone, which is a center DC tone of a plurality of DC tones, and wherein the distributed-tone RU is asymmetric to the center DC tone in which:
- the center DC tone is located asymmetrically between the left-side portion and the right-side portion,
- a first pattern of tone distribution in the left-side portion and a second pattern of tone distribution in the right-side portion are asymmetric with respect to the center DC tone, and
- the first pattern and the second pattern are of a same pattern in a two-dimensional (2D) space with one axis of DRU index in permutation order and another axis of subcarrier indices.

12. The method of claim 11, wherein the distributed-tone RU comprises a left-side (or lower) portion and a right-side (or upper) portion relative to the DC tone along the axis of subcarrier indices, and wherein the left-side portion is on a left side of the DC tone and the right-side portion is on a right side of the DC tone with a first distance between the DC tone and the left-side portion and a second distance between the DC tone and the right-side portion different from the first distance.

13. The method of claim 11, wherein the generating of the plurality of subcarrier indices comprises generating edge-tone aligned and DC-symmetric subcarrier indices.

14. The method of claim 11, wherein the generating of the plurality of subcarrier indices comprises generating center aligned and DC-symmetric subcarrier indices.

15. The method of claim 11, wherein the generating of the plurality of subcarrier indices comprises generating edge-tone aligned and DC-asymmetric subcarrier indices.

16. The method of claim 11, wherein the generating of the plurality of subcarrier indices comprises generating center aligned and DC-asymmetric subcarrier indices.

17. The method of claim 11, wherein the distributed-tone RU is distributed over a 20 MHz bandwidth, and wherein the distributed-tone RU comprises a 26-tone DRU, a 52-tone DRU or a 106-tone DRU.

18. The method of claim 11, wherein the distributed-tone RU is distributed over a 40 MHz bandwidth, and wherein the distributed-tone RU comprises a 26-tone DRU, a 52-tone DRU, a 106-tone DRU or a 242-tone DRU.

19. The method of claim 11, wherein the distributed-tone RU is distributed over a 80 MHz bandwidth, and wherein the distributed-tone RU comprises a 26-tone DRU, a 52-tone DRU, a 106-tone DRU, a 242-tone DRU or a 484-tone DRU.

20. The method of claim 11, wherein the generating of the plurality of subcarrier indices comprises providing a set of subcarrier indices for a 26-tone DRU in a table such that, for a larger-sized DRU with more than 26 tones, the generating of the plurality of subcarrier indices further comprises generating another set of subcarrier indices for the larger-sized DRU from the table and using a DRU hierarchical structure with or without one or more extra tones as padding, and wherein:
  subcarrier indices for a 52-tone DRU are generated from corresponding two 26-tone DRUs,
  subcarrier indices for a 106-tone DRU are generated from either corresponding four 26-tone DRUs or corresponding two 52-tone DRUs with two extra tones as padding,
  subcarrier indices for a 242-tone DRU are generated from corresponding two 106-tone DRUs and one 26-tone DRU with four extra tones as padding, and
  subcarrier indices for a 484-tone DRU are generated from corresponding two 242-tone DRUs.

* * * * *